(12) United States Patent
Ambroziak

(10) Patent No.: US 6,460,047 B1
(45) Date of Patent: *Oct. 1, 2002

(54) DATA INDEXING TECHNIQUE

(75) Inventor: Jacek Ambroziak, Acton, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/535,632

(22) Filed: Mar. 24, 2000

Related U.S. Application Data

(63) Continuation of application No. 09/054,373, filed on Apr. 2, 1998, now Pat. No. 6,055,526.

(51) Int. Cl.⁷ .............................................. G06F 17/30
(52) U.S. Cl. ....................................................... 707/102
(58) Field of Search .......................................... 707/102

(56) References Cited

U.S. PATENT DOCUMENTS

| | | | | |
|---|---|---|---|---|
| 4,667,290 A | * | 5/1987 | Goss et al. ................... 713/1 |
| 5,745,889 A | * | 4/1998 | Burrows ...................... 707/10 |
| 6,055,526 A | * | 4/2000 | Ambroziak ................. 707/102 |
| 6,067,566 A | * | 5/2000 | Moline ..................... 707/500.1 |

* cited by examiner

Primary Examiner—Wayne Amsbury
(74) Attorney, Agent, or Firm—Gunnison, McKay & Hodgeson, L.L.P.; Philip J. McKay

(57) ABSTRACT

A technique for indexing data is provided. A method for compressing an index to obtain a compressed index that is easily stored and transmitted is provided. The invention also provides for the decompression of such a compressed index. One embodiment of the invention maintains a separate index for each document, thereby allowing easy updating of indexes in response to changes in documents and easy transmission of indexes, which allows distributed searching. The technique provides very compact indexing information, but allows the indexing information to be very rapidly processed.

24 Claims, 19 Drawing Sheets

DATA INDEXING TECHNIQUE

This is a continuation of Ser. No. 09/054,373 filed Apr. 2, 1999 now U.S. Pat. No. 6,055,526.

BACKGROUND OF THE INVENTION

1. Field of the Invention

This invention relates to the field of data processing and, more specifically, to the indexing of data.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, "Write Once, Run Anywhere", Java, JavaOS, JavaStation, HotJava Views and all Java-based trademarks and logos are trademarks or registered trademarks of Sun Microsystems, Inc. in the United States and other countries.

2. Background Art

Computers have enabled the storage and transmission of large amounts of information. Large numbers of documents, images, multimedia works, and other information are available in an electronically-readable form. However, often only a particular piece of information is needed at a particular time. Finding the desired information among all available information can be a very difficult task.

Fortunately, computers can be programmed to search for the desired information. Computer software designed for searching, also known as "search engines," can help locate the desired information. Because of the large amount of information available, search engines generally do not search through all available information in response to each search query. Rather, search engines generally utilize a database, referred to as an index, that summarizes the content and location of the a large amount of information. An index is a compilation of specific pieces of information, for example words or phrases, each with references to locations within the document or documents that are within the scope of the index at which the specific pieces of information occur.

Nonetheless, often such search engines and indexes require large amounts of memory to store their data and program code. Such large memory requirements prevent the search engines and indexes from being used on smaller computing platforms, for example, handheld computers or appliances enhanced with data processing capability, or from being transmitted easily between computing environments, for example, over an internet connection.

SUMMARY OF THE INVENTION

The invention provides a technique for indexing data. The invention provides for the compressing an index to obtain a compressed index that is easily stored and transmitted. The invention also provides for the decompression of such a compressed index. The invention further provides for the maintenance and use of a plurality of files that contain indexing information.

The invention avoids the disadvantages of previous indexing schemes. *The invention does not require large amounts of memory to store or transmit an index. The invention may be practiced using a platform-independent programming language, for example, the Java™ programming language, to allow compatibility with almost any computing platforms, including very small or limited computing platforms. Moreover, the invention also allows very fast searching capability.

The invention provides high modularity of indexing information, thereby allowing easy distribution of indexing information, as well as easy incremental indexing and updating of indexing information. Also, the invention simplifies proximity-based searching techniques. Further, the invention provides fast searching capability by not requiring that all indexing information be decompressed to perform a search. Additionally, the invention supports multiple simultaneous queries by allowing decompression of multiple indexes simultaneously or in one procedure.

DETAILED DESCRIPTION OF THE INVENTION

A technique for indexing data is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

Though described with reference to desktop environments, the Java™ programming language and the Java™ runtime environment, embodiments of the invention may be similarly applied to other multi-threaded environments in which memory resources are constrained, such as personal digital assistants (PDA's), or where specific services are curtailed by the unloading of application program elements from memory. For example, a large application or manager mechanism with many sub-components or sub-applications may implement an embodiment of the invention to simultaneously run a limited number of sub-components while maintaining, in independent threads, specific services of those sub-components that are currently not running. Also, embodiments of the invention may be directed to providing specific services other than, or in addition to, user notification, such as monitoring and simple resource management tasks.

Embodiment of Computer Execution Environment (Hardware)

Figure 1:
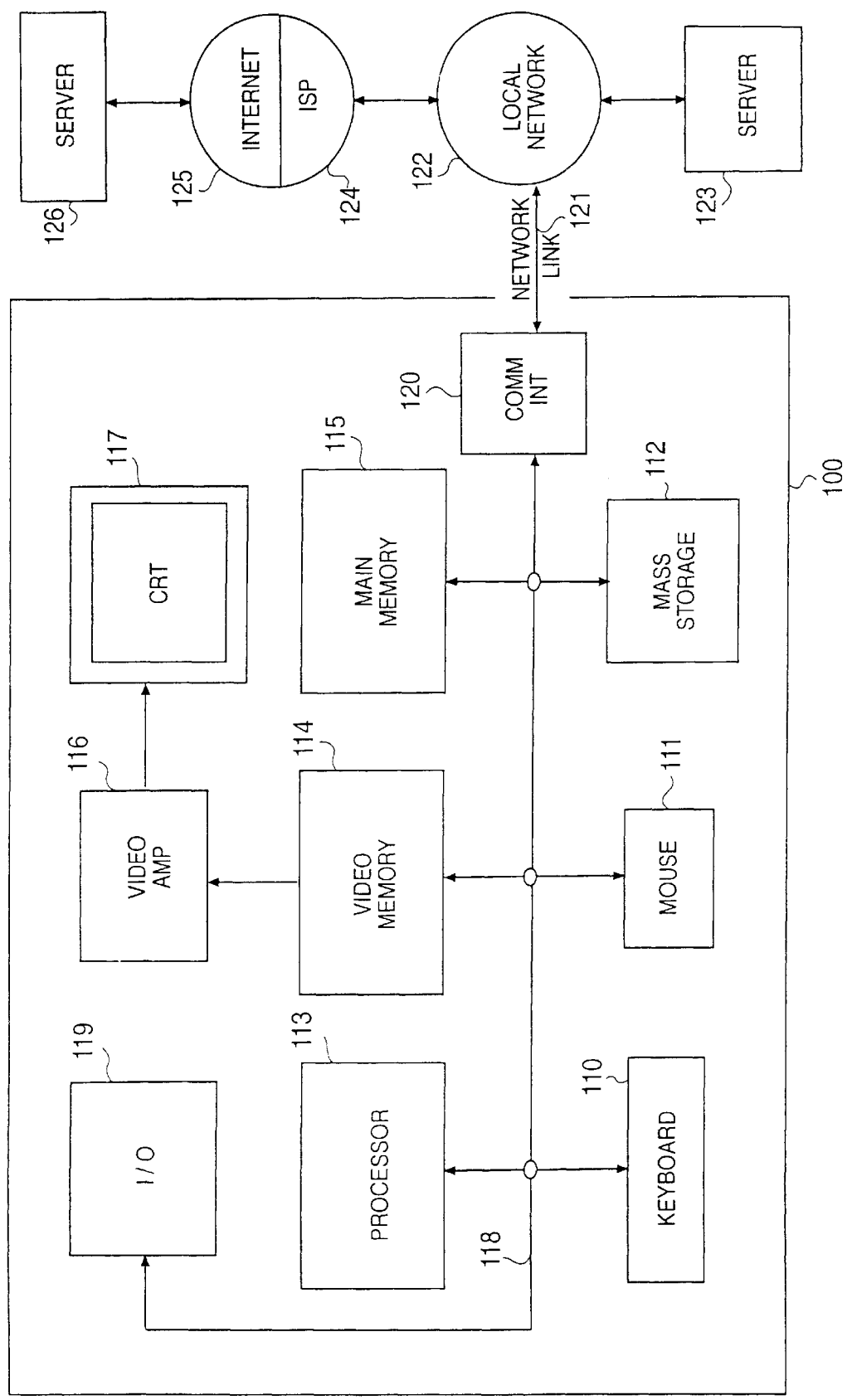
FIG. 1 is a block diagram of one embodiment of a computer system capable of providing a suitable execution environment for an embodiment of the invention.

An embodiment of the invention can be implemented as computer software in the form of computer readable code executed on a general purpose computer such as computer 100 illustrated in FIG. 1, or in the form of bytecode class files executable within a Java™ runtime environment running on such a computer. A keyboard 110 and mouse 111 are coupled to a bi-directional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bidirectional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680X0 processor or a microprocessor manufactured by Intel, such as the 80X86, or Pentium processor, or a SPARC™ microprocessor from Sun Microsystems™, Inc. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120. In accord with the invention, one such downloaded application is the apparatus for performing user notification described herein.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

The Java™ programming language, developed by Sun Microsystems™, Inc., has an advantage over other programming languages of being a "write once, run anywhere"™ language. The Java™ programming language provides a substantially platform-independent mechanism for applications to be designed, distributed and executed in the form of bytecode class files. The Java™ virtual machine within the Java™ runtime environment handles the resolution of the bytecodes into the requisite platform dependent instruction set, so that all computing platforms which contain a Java™ runtime environment are capable of executing the same bytecode class files.

Java™-based systems, such as HotJava Views™, are being developed that allow enterprises to load applications, in the form of applets, from a centralized server. Each client on the network accesses and executes the same applications, regardless of computing platform, and the source files remain in a centralized and controlled location. As a result, application management requirements are minimized. This client-server arrangement also permits the use of network computers, i.e., "thin client" computers with minimized I/O and storage facilities.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_Salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class. The Java™ programming language also provides a mechanism known as an "interface" which comprises a set of constant and abstract method declarations. An object class can implement the abstract methods defined in an interface. Both single and multiple inheritance are available to an interface. That is, an interface can inherit an interface definition from more than one parent interface.

An object is a generic term that is used in the object-oriented programming environment to refer to a module that contains related code and variables. A software application can be written using an object-oriented programming language whereby the program's functionality is implemented using objects.

Java™ Programming and Execution

The Java™ programming language is an object-oriented programming language with each program comprising one or more object classes and interfaces. Unlike many programming languages, in which a program is compiled into machine-dependent, executable program code, Java™ classes are compiled into machine independent bytecode class files. Each class contains code and data in a platform-independent format called the class file format. The computer system acting as the execution vehicle supports the Java™ runtime environment. The runtime environment contains a program called a virtual machine, which is responsible for executing the code in Java™ classes.

Applications may be designed as standalone Java™ applications, or as Java™ "applets" which are identified by an applet tag in an HTML (hypertext markup language) document, and loaded by a browser application. The class files associated with an application or applet may be stored on the local computing system, or on a server accessible over a network. Each class is loaded into the runtime environment, as needed, by the "class loader."

The classes of an applet are loaded on demand from the network (stored on a server), or from a local file system, when first referenced during the applet's execution. The runtime environment locates and loads each class file, parses the class file format, allocates memory for the class's various components, and links the class with other already loaded classes. This process makes the code in the class readily executable by the virtual machine.

Figure 2:
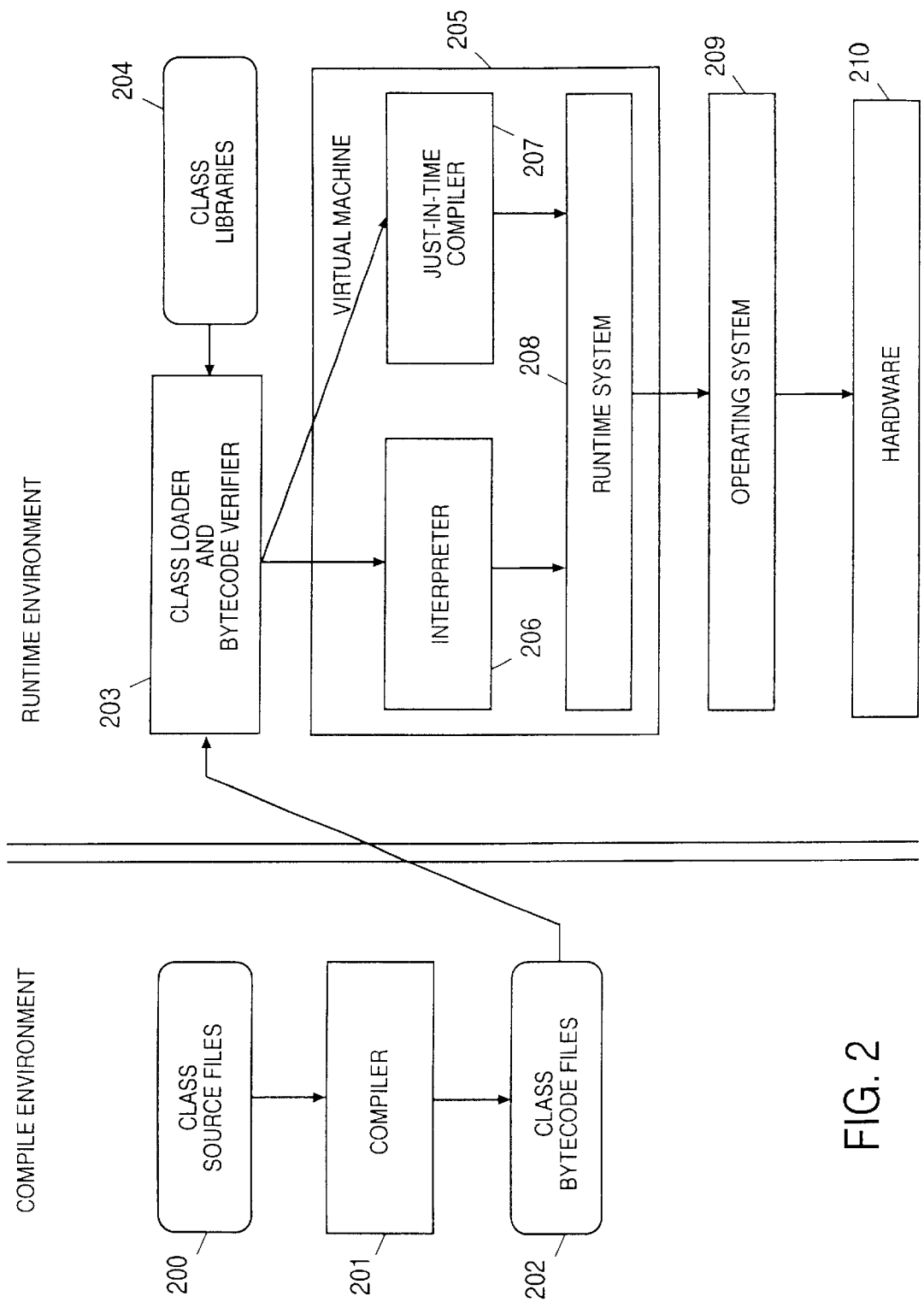
FIG. 2 is a block diagram of a Java™ development and runtime environment.

FIG. 2 illustrates the compile and runtime environments for a Java™ system. In the compile environment, a software developer creates source files 200, which contain the programmer readable class definitions, including data structures, method implementations and references to other classes. Source files 200 are provided to compiler 201, which compiles source files 200 into compiled ".class" files 202 that contain bytecodes executable in a Java™ runtime environment. Bytecode class files 202 are stored (e.g., in temporary or permanent storage) on a server, and are available for download over a network. Alternatively, bytecode class files 202 may be stored locally in a directory on the client platform.

The Java™ runtime environment contains a virtual machine 205 which is able to execute bytecode class files and execute native operating system ("O/S") calls to operating system 209 when necessary during execution. Virtual machine 205 provides a level of abstraction between the machine independence of the bytecode classes and the machine-dependent instruction set of the underlying computer hardware 210. Class loader and bytecode verifier ("class loader") 203 is responsible for loading bytecode class files 202 and supporting Java™ class libraries 204 into virtual machine 205 as needed. Either an interpreter 206 executes the bytecodes directly, or a "just-in-time" (JIT) compiler 207 transforms the bytecodes into machine code, so that they can be executed by the processor in hardware 210. Class loader 203 also verifies the bytecodes of each class file to maintain proper execution and enforcement of Java™ security rules.

Java™ class files are often identified in applet tags within an HTML (hypertext markup language) document. To provide a client with access to class files from a server on a network, a web server application is executed on the server to respond to HTTP (hypertext transport protocol) requests containing URLs (universal resource locators) to HTML documents, also referred to as "web pages." When a browser application executing on a client platform receives an HTML document (e.g., as a result of requesting an HTML document by forwarding a URL to the web server), the browser application parses the HTML and automatically initiates the download of the bytecode class files 202 when it encounters the applet tag in the HTML document.

Memory is allocated to store and execute the downloaded applet. The allocation of memory to new applets may lead to a low memory condition as the number of applets in the Java™ runtime environment grows. To resolve the low memory condition, older, invisible applets (i.e., applets that are not currently visible on a display) may be unloaded, or "destroyed" (i.e., shutdown and de-allocated), to release memory.

Format of Indexing Information

One embodiment of the invention provides a plurality of files that interrelate with one another to provide the desired indexing capability. For example, one file is useful for determining which documents contain reference to a specific concept, while another file is useful for identifying the position of references to a specific concept within a particular document. Thus, each of the files provided according to the present invention will be described.

Figure 3:
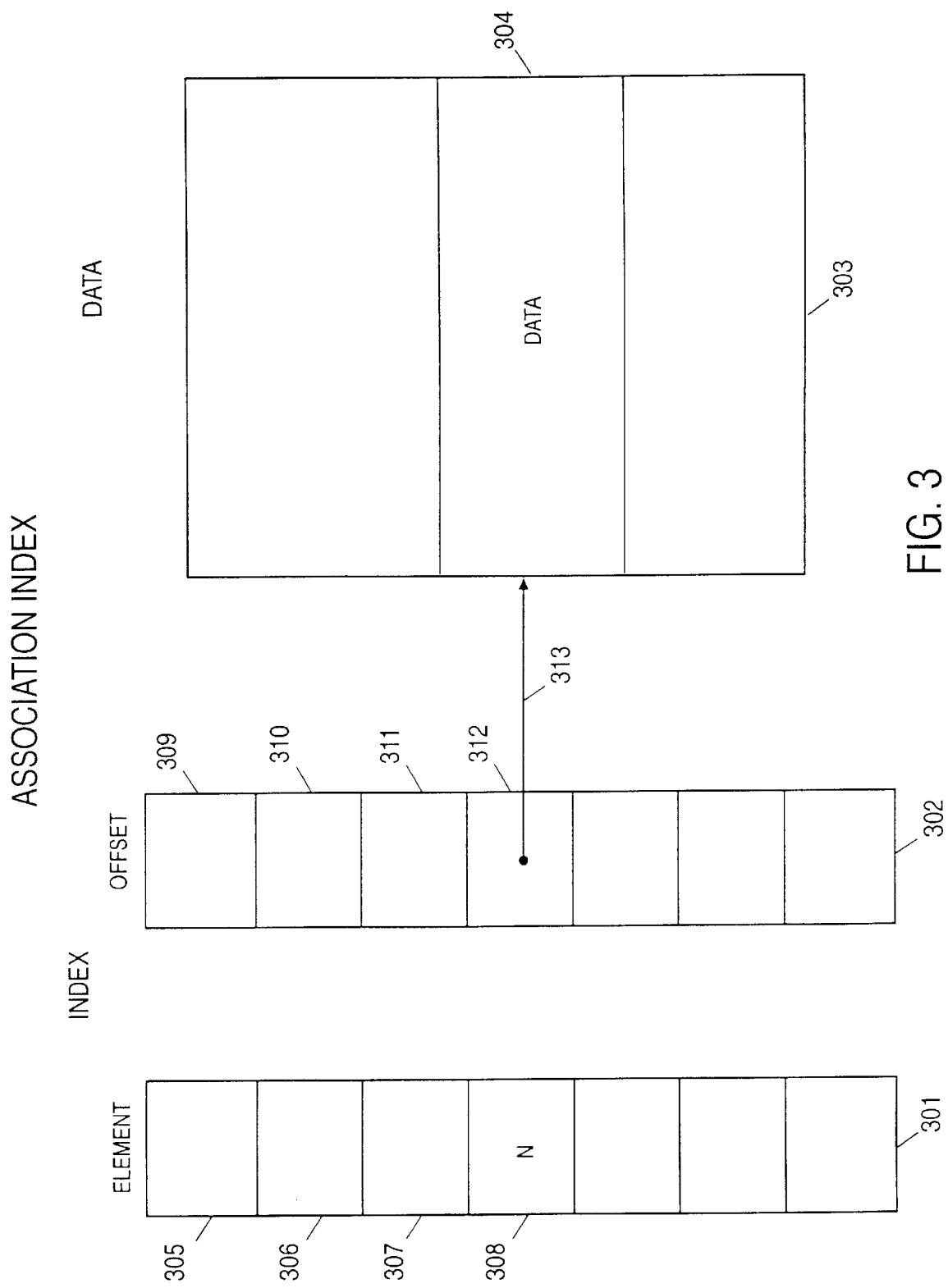
FIG. 3 illustrates a block diagram of an association index according to one embodiment of the invention.

FIG. 3 illustrates a block diagram of an association index according to one embodiment of the invention. In one embodiment of the invention, an association index is a pair of parallel tables. An element table 301 contains elements 305, 306, 307, and 308, and an offset table contains offsets 309, 310, 311, and 312 of data in an associated file. The nth element in the element table 301 corresponds to the nth offset in the offset table 302. For example, element 308 corresponds to offset 312. Offset 312 contains a pointer, or reference, 313 to a location of data block 304 within data file 303.

In one embodiment of the invention, the indexing system comprises eight files. These files include the following: a schema file, a terminology map file, a positions file, a position index file, a documents file, a documents index file, a children file, and a children index file. A schema file defines key element in various search database files. A terminology map file provides a mapping of concept names to their unique identifiers.

A positions file provides a collection of document microindexes. A position index contains an association index of document identifiers and offsets of their corresponding microindexes in the positions file. A documents file contains a collection of lists, where each list is a collection of document indexes (into the position index file) for a given concept. A documents index file contains an association index of concepts and offsets of their corresponding list in the documents file. A children file contains a collection of lists, where each list contains identifiers of more specific concepts for a given concept. A children index file contains an association index of concepts and offsets of their corresponding list in the children file.

Compression Method

One embodiment of the invention may be practiced with a compression method that divides each component of information to be compressed into two parts. One part is referred to as a prefix, while the other part is referred to as a suffix. The prefix and suffix are defined to maximize the likelihood that several components of information will have identical prefixes and will differ only in their suffix. To the extent possible given this consideration, it is also desirable for the purpose of compression to maximize the length of the prefix while minimizing the length of the suffix.

When a common prefix is found among multiple components of information, those components of information are organized so as to identify them as having the common prefix. Since it is then known that those components of information have the same prefix, only the suffix of each individual component of information need be stored. For example, if the prefix of a component of information is identical to the previous component of information, only the suffix of the component of information need be stored. If, however, the prefix of that component of information differs from the prefix of the previous component of information, both the prefix and suffix of the component of information are stored. A flag or other indicator may be used to indicate the presence or absence of the different prefix.

The concept identifier labels, for example 4-bit labels used to distinguish concept identifiers within C/P (concept-position) groups, also serve as a form of compression. These labels provide within each C/P group a sort of "shorthand" representation of the complete concept identifier, which may be much longer than the label. For example, if a complete concept identifier were 16 bits in length, the complete concept identifier would only occur once in a C/P group, while any other references to that concept identifier within the C/P group would be made using the 4-bit label that corresponds to that concept identifier within the context of that particular C/P group.

Another property used to achieve compression is the fact that the document index file, the documents file, and the position index file can all be reconstructed from the positions file. Thus, only one file, the positions file, needs to be transmitted to a distributed search engine, instead of four files (the document index file, the documents file, the position index file, and the positions file). This reconstruction property thus serves to reduce the amount of information transmitted to transmit the indexing structure and minimizes the memory needed to store the indexing structure.

The invention may also be practiced with other compression techniques, such as those known in the art. By combining multiple compression techniques that have been carefully designed to work in conjunction with one another, the maximum overall compression effect is achieved.

Various data structures within the search database files contain a sequence of integers. To decrease the overall size of the files, a compression method is used to convert a sequence of integers to a small number, referred to as k, and a sequence of bytes. Given k, the byte sequence can be decoded to produce the original integer sequence.

One embodiment of the invention uses an integer sequence compression method. The method compresses sequences of nonnegative integers into a compact memory representation. The input is the nonnegative integer sequence, and the output consists of a small integer ('k') and an array of bytes containing the compressed sequence. An associated decompression routine takes 'k' and the byte array and reconstructs the original sequence.

The integer sequence compression me-hod's core takes 'k' and the sequence of integers to compress and produces the encoding. This process is repeated for varying 'k's to find a 'k', which produces the shortest encoding.

As the integer sequence is processed, the core integer sequence compression method emits bits and sequences of bits into the output buffer. An example will help illustrate the method. For the purpose of this example, it can be assumed that the binary representation of the I-th integer consists of n-I significant bits. The method attempts to reuse (factor out) the shared prefixes of most significant bits between binary representations of successive integers. The output, logically, consists of a series of 'jumps' and 'values'. 'Values' represent the last (least significant) k bits of the original integers. 'Jumps' provide updates to the prefixes (n-k) most significant bits. A 'jump' is always followed by one or more 'values', which are signaled with single '1' bits, except when directly following a 'jump'. 'Jumps' begin with '0' bits. An example of a series of 'jumps' and 'values' is as follows: JV1V1VJVJV1V.

'Values' always consist of 'k' bits. 'Jumps' update the shared most significant bits. Each jump consists of n zeroes, followed by a one, followed by n bits with which the last n bits of the prefix need to be replaced. The whole sequence is terminated by a dummy jump, which although technically a jump, does not modify the prefix.

On decompression, the operating state of the method can be readily determined. For example, after a jump k bits of a value are expected. After a value, '1' will signify another value, '0' will begin a jump. In a jump first all of the '0's need to be read and counted up to the first '1' after which the same count of bits needs to be read to replace the last bits of prefix.

Most files relating to the invention are stored in a compressed form. In one embodiment of the invention, the files are organized according to a data structure wherein the first byte is a compression factor or key for the compressed list encoded in a series of bytes. This compressed list of elements is stored after the compression factor or key for the element list. The number of bytes in the compressed list of elements is a function of the compression factor or key and the contents of the list. Following the element list compression factor or key and the compressed list of elements is an offset list compression factor or key and a compressed list of offsets.

The schema file defines important elements, such as block size, root block position, the first empty block position, a list of free block positions, the next identifier in the list of free block positions, and a current number of elements in the various files of the search database. Tags representative of these elements are stored in the schema file. Block size refers to the block size of a concept collection. In one embodiment of the invention, the block size is denominated in increments of 32.

In one embodiment of the invention, the first empty block position is denoted by a valid integer between -1 and the value of the next identifier in the list of free block positions minus one. The value of -1 is used to indicate the existence of no empty blocks. In one embodiment of the invention, the list of free block positions is a list of valid integers between 0 and the value of the next identifier in the list of free block positions minus one, with the elements of the list separated by a comma. The current size of the list is determined by subtracting one from the next identifier in the list of free block positions.

Figure 4:
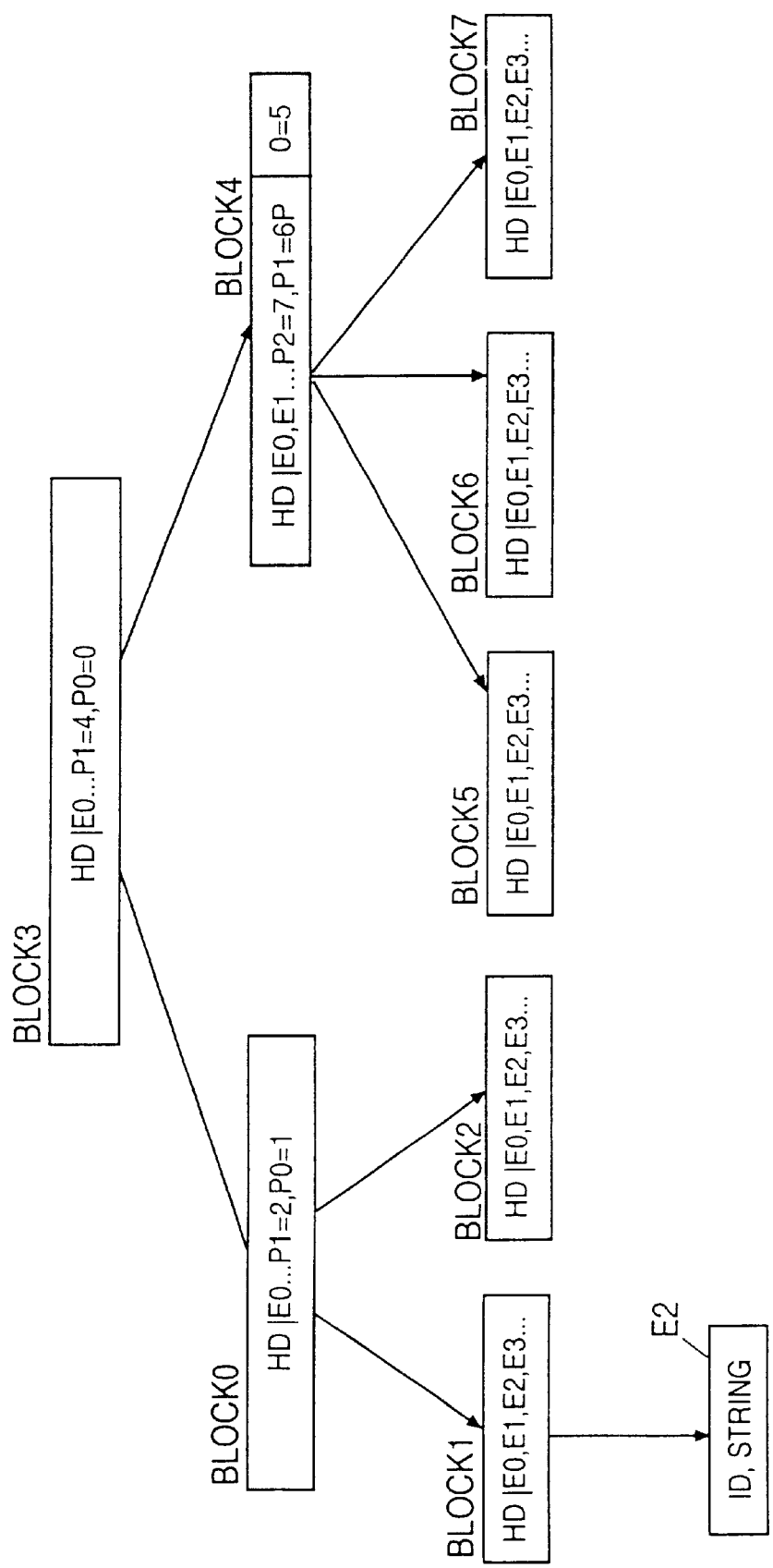
FIG. 4 is a tree structure diagram illustrating an example of a terminology map according to one embodiment of the invention.

FIG. 4 is a tree structure diagram illustrating an example of a terminology map according to one embodiment of the inventions. A terminology map is a mapping of concept name to their unique identifiers. The name/identifier pair entries are stored in a tree structure in a lexicographical order according to their byte codes. Tree root block "block3" is the root block of the tree structure and is also considered to be an internal block. Tree root block "block3" contains a header followed by a series of lexicographically ordered entries, as well as a series of block numbers for its children.

The children of "block3" are "block0" and "block4," both of which are internal blocks. Internal block "block0" contains a header followed by a series of lexicographically ordered entries, as well as a series of block numbers for its children. The children of "block0" are "block1" and "block2," both of which are leaf blocks since no further blocks descend from "block1" or "block2." Each of "block1" and "block2" contains a header followed by a series of lexicographically ordered entries. An entry describes a concept. Thus, an entry (for example, entry e2) contains a concept identifier and a concept string.

Internal block "block4" contains a header followed by a series of lexicographically ordered entries, as well as a series of block numbers for its children. The children of "block4" are "block5," "block6," and "block7," all of which are leaf blocks since no further blocks descend from "block5," "block6," or "block7." Each of "block5," "block6," and "block7" contains a header followed by a series of lexicographically ordered entries.

Figure 5:
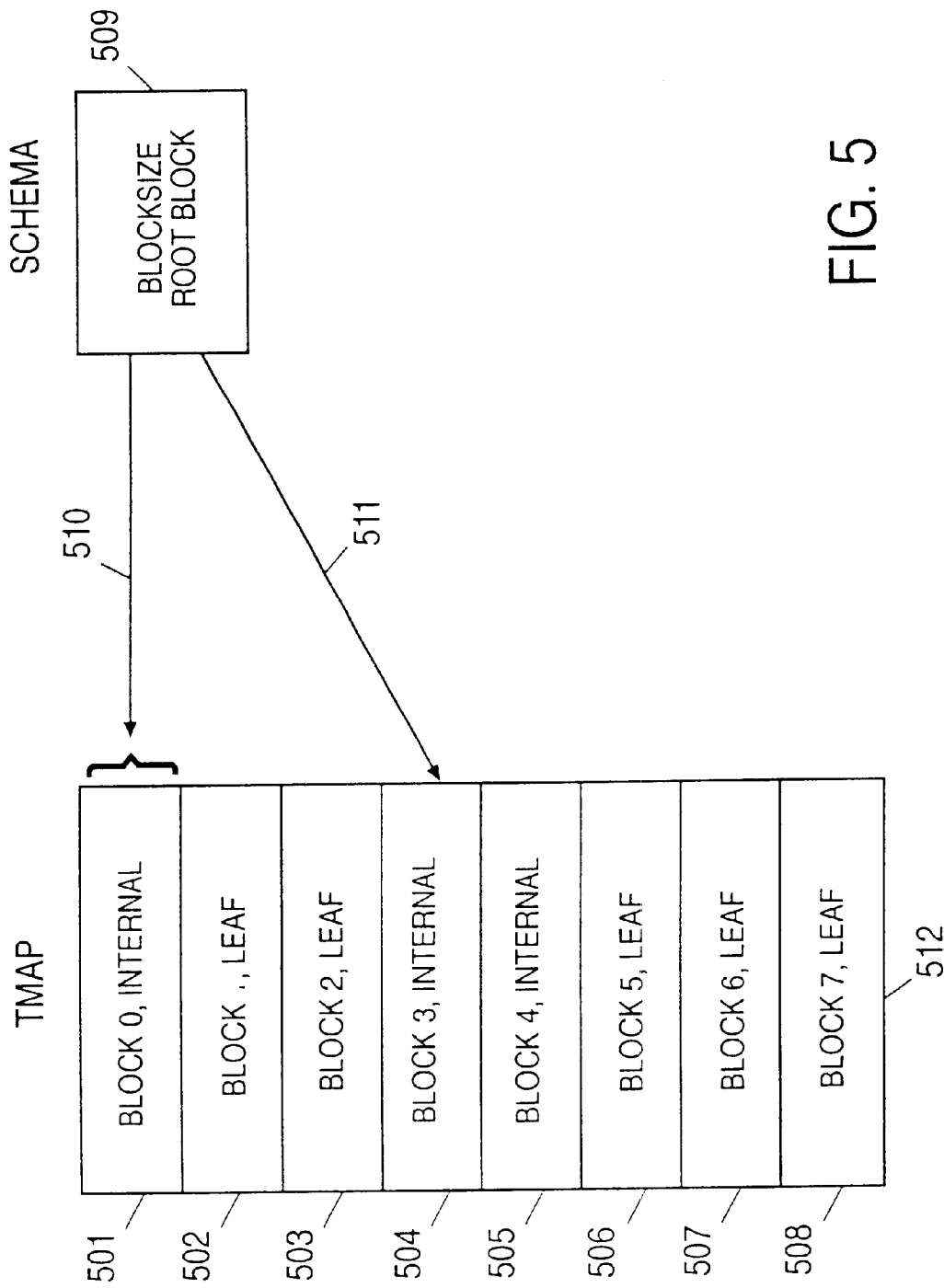
FIG. 5 is a block diagram illustrating the terminology map file layout according to one embodiment of the invention.

FIG. 5 is a block diagram illustrating the terminology map file layout according to one embodiment of the invention. The blocks of the tree structure are stored sequentially in a terminology map file. Blocks are either internal or leaf blocks. The size of the blocks is determined by the block size tag in the schema file. In one embodiment, the default block size is 2048.

Internal block "block0" is stored at location 501 and marked as an internal block. Leaf blocks "block1" and "block2" are stored at locations 502 and 503, respectively, and marked as leaf blocks. Internal blocks "block3" and "block4" are stored at locations 504 and 505, respectively, and marked as internal blocks. Leaf blocks "block5," "block6," and "block7" are stored at locations 506, 507, and 508, respectively, and marked as leaf blocks.

Collectively, locations 501–508 form terminology map 512. Schema file 509 contains important elements relevant to terminology map 512, such as block size, root block position, the first empty block position, a list of free block positions, the next identifier in the list of free block positions, and a current number of elements in the various files of the search database. For example, block size parameter 510 describes the size of a block in terminology map 512, for example, the size of "block0" at location 501. Root block parameter 511 indicates "block3" at location 504 as the root block of the tree structure.

In one embodiment of the invention, a terminology map block begins with an integer value representative of a block number. Following this integer value is one bit used to distinguish between leaves and internal blocks. For example, the bit may be set to zero to denote a leaf or set to one to denote an internal block. Following this bit are 31 bits that serve as an index to the first free byte in the entries or pointers. Following these 31 bits is an integer value used to indicate the number of entries in the block. Following this integer value are a plurality of bytes (n bytes) used to store the entries or pointers, where n is equal to the block size less the sum of 32 bits and twice the space needed to store an integer value.

Within one embodiment of the terminology map, a leaf block is a block at the end of a branch of the tree structure. Thus, a leaf block has no branches descending from it to additional elements of the tree structure farther from the root of the tree structure. A leaf block stores a header followed by a series of lexicographically ordered entries. If an entry shares a prefix with a preceding entry, only the remaining suffix of the entry need be stored. An entry describes a concept. A concept is an element of information for which indexing is sought. For example, a concept may be a word or a phrase.

In one embodiment of the invention, a concept entry has a structure that begins with a byte representative of the length of the concept or key. This byte is followed by a byte denoting the length of the shared prefix. The shared prefix is a component of an entry that is common to another entry, for example, the preceding entry. The byte denoting the length of the shared prefix is followed by an integer value indicating the concept identifier that is unique to the concept. Following the integer value is a plurality of bytes of information (n bytes) used for storing the concept name or concept suffix, where n is the concept length. The concept name is a portion of the concept that is unique among concepts having the same shared prefix.

Compression of concept entries increases the number of concept entries in a block and reduces the overall file size. If the first n bytes of a concept is identical to the prior concept. The matching bytes of the concept are removed from the concept string and the number of matching bytes is stored in compressed bytes. Note that the first concept entry of a block is not compressed in one embodiment of the invention.

Within one embodiment of the terminology map, an internal block has other blocks in the same branch of the tree structure, but farther from the root block. The root block itself may be considered to be an internal block. An internal block differs from a leaf block in that an internal block also has a series of block numbers of its children. Concept entries are stored following the block header from the beginning to the middle of the entry/pointer region. Block numbers are integers stored in reverse order from the end of the entry/pointer region towards the middle.

The first concept entry corresponds to the last block number. The block pointed to by the corresponding block number contains entries that are lexicographically smaller than the concept entry. Referring to FIG. 4, as an example, e0 is lexicographically greater than all entries in block5. All entries in block6 are between e0 and e1, and all entries in block7 are greater than e1.

Microindexes

One embodiment of the invention provides microindexes. Microindexes are data structures for storing indexing information in a compressed form. Two types of microindexes are a single group index and a multiple group index. Single group indexes are indexes that use a single concept-position (C/P) group. Multiple group indexes are indexes that use multiple C/P groups. In one embodiment of the invention, concept identifiers and positions are stored in C/P groups of 16 or fewer concepts. The first two bits of a microindex is used to denote the type of group, with 00 denoting a single group index (e.g., 16 or fewer concepts) and with 10 denoting a multiple group index (e.g., 17 or more concepts).

Positions

A positions file is a collection of microindexes. Microindexes are independent of one another and are stored one after another. There is one microindex per indexed document. The one-to-one correspondence of microindexes to indexed documents provides a modular structuring of indexing information.

Figure 6:
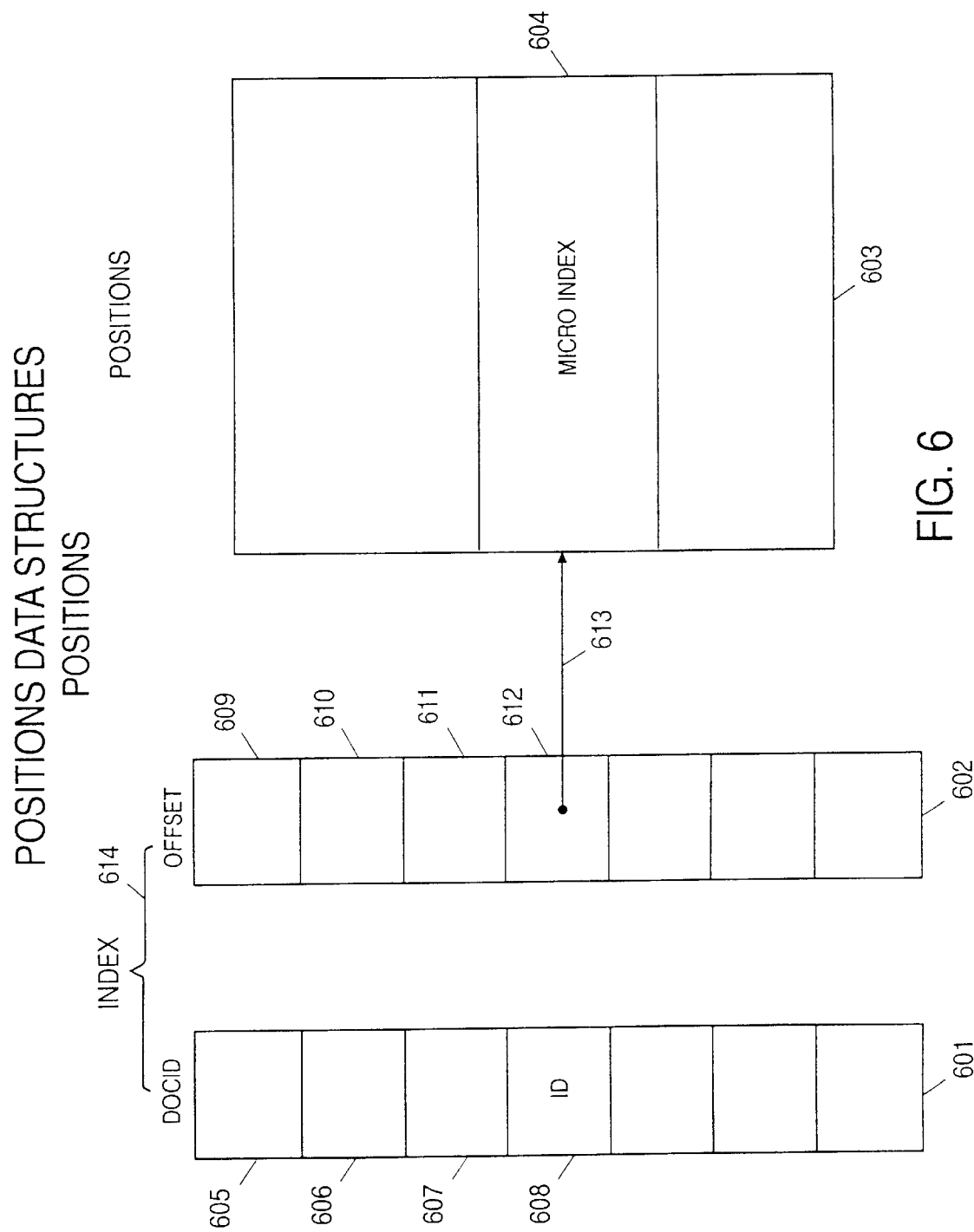
FIG. 6 is a block diagram illustrating the relationship between a positions file and a positions index file according to one embodiment of the invention.

FIG. 6 is a block diagram illustrating the relationship between a positions file and a positions index file according to one embodiment of the invention. A positions file 603 is a collection of microindexes 604. The microindexes 604 are independent of one another and are stored one after another. There is one microindex per indexed document.

A positions index 614 is an association index of document identifiers 601 and corresponding offsets 602 of microindexes in a positions file. The collection of document identifiers 601 comprises individual document identifiers 605, 606, 607, and 608. The collection of offsets 602 comprises individual offsets 609, 610, 611, and 612. The nth document identifier corresponds to the nth offset. For example, document identifier 608 corresponds to offset 612. Offset 612 comprises a pointer 613 to microindex 604 in positions file 603.

Single Indexes

A single index C/P group contains 16 or fewer concepts, in an embodiment of the invention. It is provided to support uses of the search engine that involve relatively few concepts. An example would be the storing of an index to subject lines of electronic mail messages.

Figure 7:
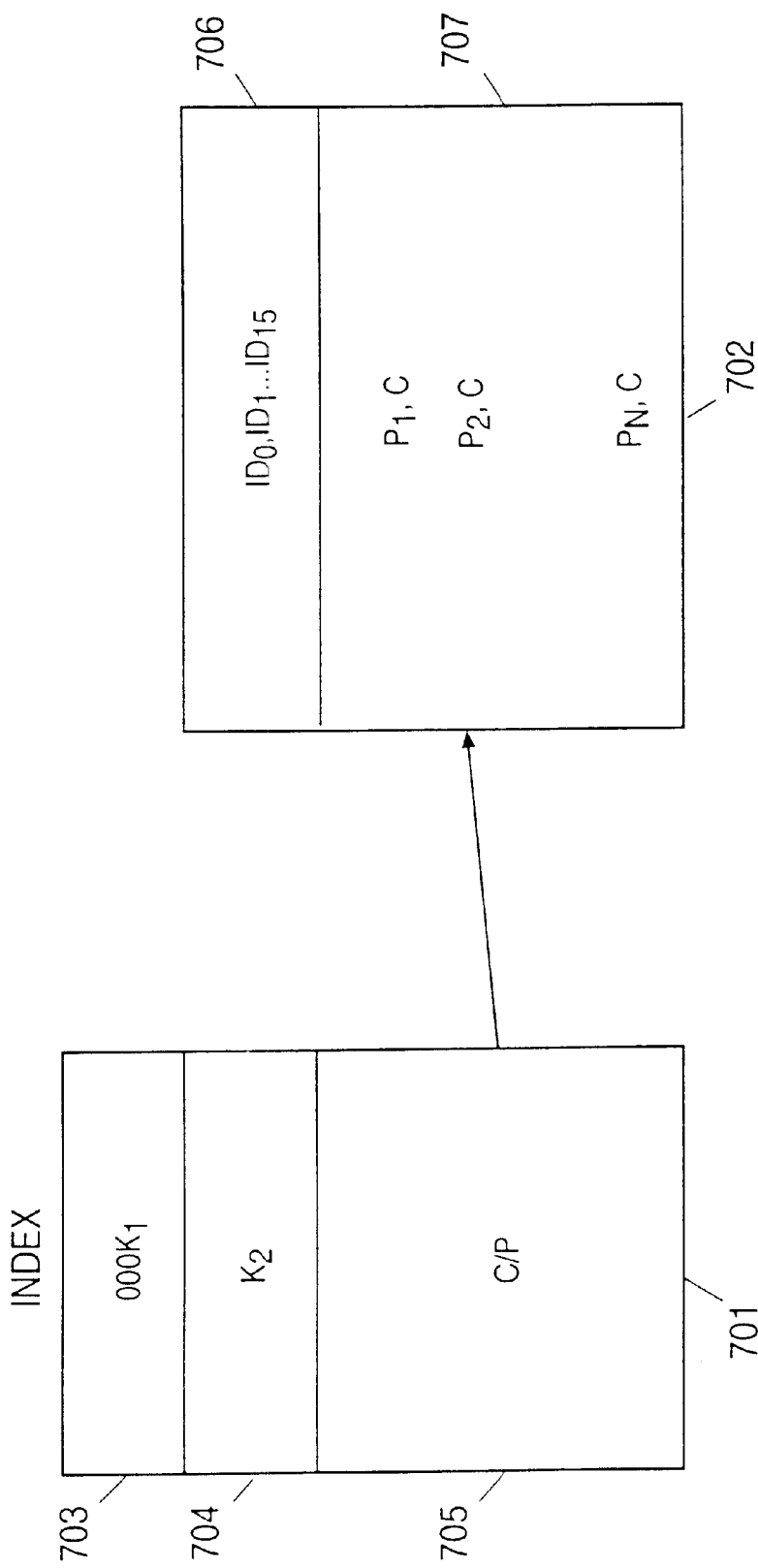
FIG. 7 is a diagram illustrating a single group index structure according to one embodiment of the invention.

FIG. 7 is a diagram illustrating a single group index structure according to one embodiment of the invention. The illustrated C/P group contains two compressed lists. The first, with a compression factor, or key, of $K_1$, is a list of at most 16 concept identifiers in ascending order. The second, with a compression factor, or key, of $K_2$, is a list of pairs of positions and 4-bit indexes into the first list. Positions (offsets) are stored in ascending numerical order. The C/P group is on a byte boundary, but there is no byte boundary between the two compressed lists.

Single group index 701 comprises a header and compression factor, or key, of $K_1$ in block 703, compression factor, or key, of $K_2$ in block 704, and compressed C/P group 705. When uncompressed using the compression factors, or keys, compressed C/P group 705 yields decompressed C/P group 702. Decompressed C/P group 702 comprises concept identifiers $id_0$–$id_{15}$ in block 706 and positions $p_1,c$ through $p_n,c$ in block 707.

The format of a single group index data structure according to one embodiment of the invention is that the data structure begins with 3 bits of information used to identify the type of group. Since the index is a single group index, the 3 bits of information are 000. The 3 bits of information are followed by 29 bits of information used to store the concepts compression factor, or $K_1$. Following the 29 bits of information used to store the concepts compression factor is one byte of information used to store the positions compression factor. This one byte of information is followed by a plurality of bytes of information (n bytes) used to store a compressed list of concept identifiers and a compressed list of positions. Each of the positions is followed by a 4-bit number identifying the concept from among the concepts in this group. The number of bytes (n bytes) is determined by the compression factors used.

Multiple Indexes

A multiple index contains multiple C/P groups (e.g., for 17 or more concepts). Concept identifiers and positions are stored in concept groups of at most 16 concepts, in an embodiment of this invention. Concept identifiers are stored in ascending identifier order and then divided into groups.

Figure 8:
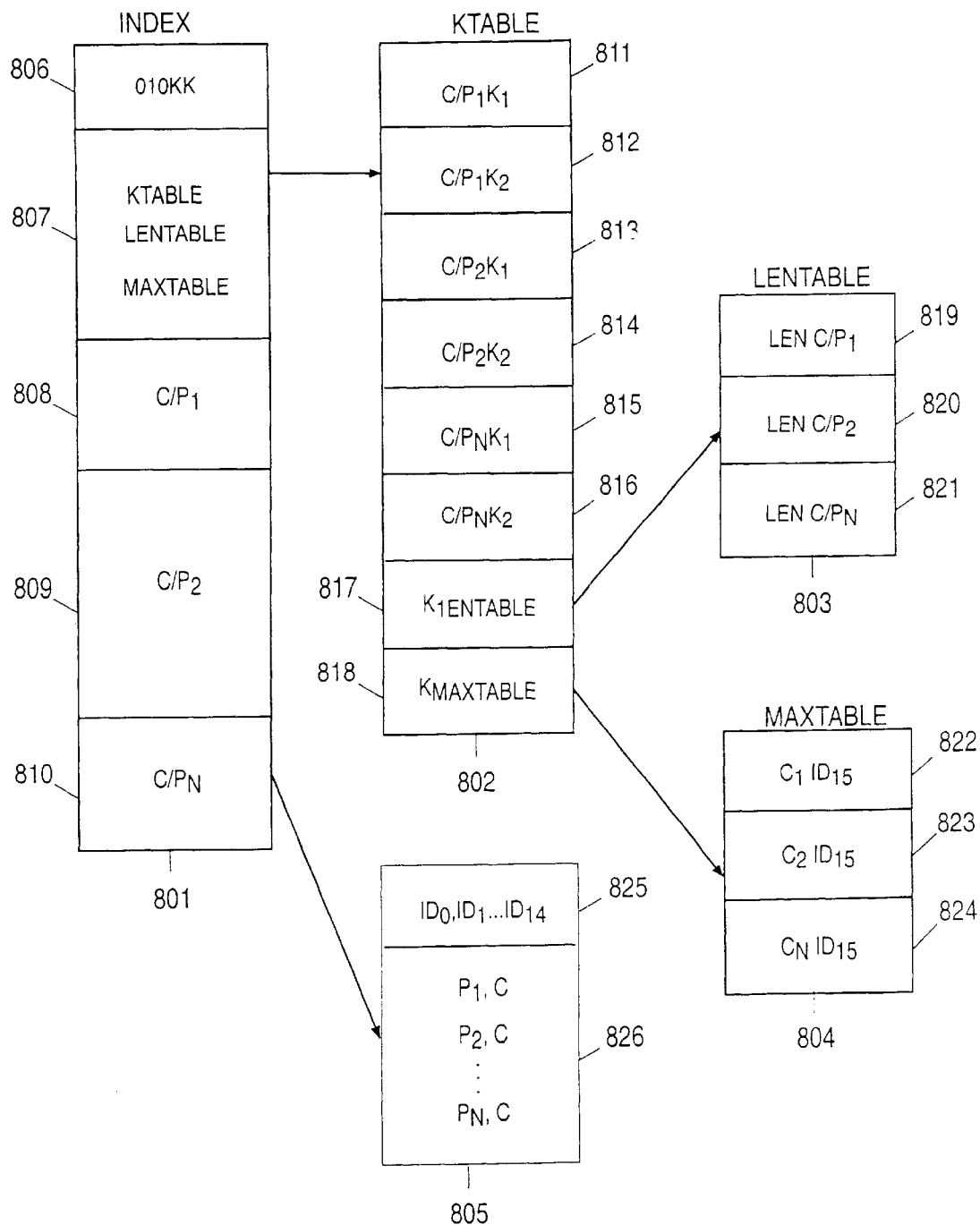
FIG. 8 is a diagram illustrating a multiple group index structure according to one embodiment of the invention.

FIG. 8 is a diagram illustrating a multiple group index structure according to one embodiment of the invention. A multiple group index 801 comprises a header and compression factor, or key, KK, in block 806, a KTable, LenTable, and MaxTable in block 807, a C/P group in block 808, a C/P group in block 809, and a C/P group in block 810. The key KK is used to decompress KTable 802. KTable 802 comprises a plurality of compression factor, or key, pairs 811, 812, 813, 814, 815, and 816 for decompressing multiple C/P groups, as well as a compression factor, or key, $K_{lentable}$ 817 for decompressing LenTable, and a compression factor, or key, $K_{maxtable}$ 818 for decompressing MaxTable.

LenTable 803 comprises information concerning the lengths of the C/P groups of index 801. For example, LenTable 803 comprises information concerning the length 819 of C/P group 1 in block 808, the length 820 of C/P group 2 in block 809, and the length 821 of C/P group 3 in block 810.

MaxTable 804 comprises information concerning the maximum value of concept identifier found in each C/P group of index 801. For example, MaxTable 804 comprises information concerning the maximum value 822 of concept identifier found in C/P group 1 in block 808, the maximum value 823 of concept identifier found in C/P group 2 in block 809, and the maximum value 824 of concept identifier found in C/P group 3 in block 810.

The C/P group key pairs found in KTable 802 are used to decompress the C/P groups found in index 801. For example, a key pair comprising keys $K_1$ and $K_2$ for C/P group n in block 810 is found in locations 815 and 816. Key $K_1$ from location 815 is used to decompress concept identifiers 825, which are part of decompressed C/P group 805. Key $K_2$ from location 816 is used to decompress positions 826, which are also part of decompressed C/P group 805.

The illustrated index structure describes the actual data structure memory layout. The first byte contains the compression factor (KK) for the following compressed KTable. The KTable, LenTable, and MaxTable immediately follow the compression factor (KK) without byte boundaries. These are then followed by a plurality of consecutive C/P groups (n C/P groups) on byte boundaries.

The contents of the KTable are pairs of compression factors for C/P groups. The last two entries in the table are the compression factors for the LenTable and MaxTable. The LenTable is a list of lengths for the first n−1 C/P groups. The MaxTable is a list of maximal concept identifiers for the first n−1 C/P groups.

A C/P group contains two compressed lists. The first, with a compression factor of $K_1$ from the KTable, is a list of 15 concept identifiers in ascending order for the first n−1 groups.

The 16th concept id for each of the first n−1 C/P groups is stored in the MaxTable. The last C/P group stores 16 or fewer concepts in ascending order. The second list in each C/P group, with a compression factor of $K_2$ from the KTable, is a list of pairs of positions and 4-bit indexes into the first list. Positions (offsets) are stored in ascending numerical order. The C/P group is on a byte boundary, but there is no byte boundary between the two compressed lists.

The format of a multiple group index data structure according to one embodiment of the invention is that the data structure begins with 3 bits of information to denote the type of group. Since this is a multiple group index data structure, the 3 bits have the value 010. Following these 3 bits are 29 bits used to store a compression factor, or key, used for decompression. Following these 29 bits are a plurality of bytes (n bytes) used to store three compressed lists.

The three compressed lists are a compressed list of C/P group lengths, referred to as a "LenTable," a compressed list of maximal concept identifiers for the C/P groups, referred to as a "MaxTable," and a compressed list of compression factors, or keys, for decompressing the LenTable, MaxTable, and C/P groups, referred to as a "KTable." These three compressed lists are followed by a plurality of bytes (n bytes) used to store a plurality of C/P groups. The numbers of bytes represented by the variable n may vary in each instance the variable is used and may depend upon the compression factors, or keys, used.

The format of a concept group, or C/P group, data structure according to one embodiment of the invention is that the data structure contains a plurality of bytes of information (n bytes) and includes a compressed list of concept identifiers, a compressed list of positions. Each of the positions is followed by a 4-bit number identifying the concept within this group to which it relates. The number of bytes of information (n bytes) depends upon the compression factors, or keys, used for compression.

Documents File

The documents file is a collection of lists, where each list is a collection of document indexes (into the positions index) for a given concept.

The format of a documents file data structure according to one embodiment of the invention is that the data structure begins with a byte of information used to store a compressing factor, or key, for decompression. This byte of information is followed by a plurality of bytes of information (n bytes) used to store compressed indexes into a positions index. These compressed indexes are decompressed using the compression factor, or key, that precedes them in the documents file. The number of bytes used to store the compressed indexes (n bytes) may vary and depends on the compression factor, or key, used.

Documents Index

A documents index is an association index of concept identifiers and corresponding offsets of compressed lists of documents in the documents file.

Figure 9:
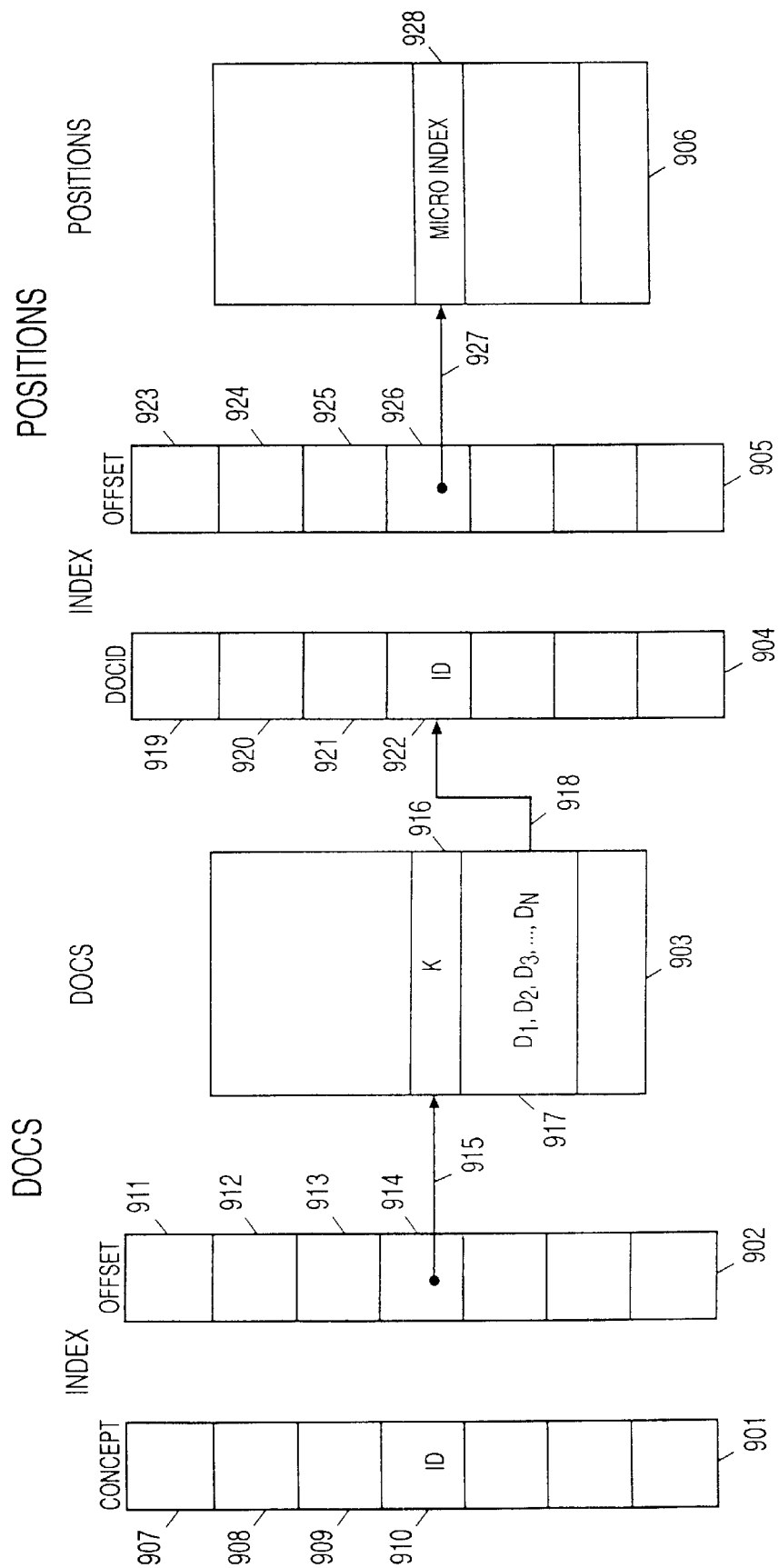
FIG. 9 is a diagram illustrating the relationships between a document index file, a documents file, a position index file, and a positions file.

FIG. 9 is a diagram illustrating the relationships between a document index file, a documents file, a position index file, and a positions file. The document index file comprises a collection of concept identifiers 901 and a collection of offsets 902. The collection of concept identifiers 901 comprises concept identifiers 907, 908, 909, and 910. The collection of offsets 902 comprises offsets 911, 912, 913, and 914. The nth concept identifier of the collection of concept identifiers 901 corresponds to the nth offset of the collection of offsets 902. For example, concept identifier 910 corresponds to offset 914. Offset 914 provides a pointer to an entry in documents file 903.

The entry in documents file 903 comprises a compression factor, or key, 916 and compressed document ID index 917. Pointer 918 corresponds to the entry in documents file 903 indexed by pointer 915. Using key 916, compressed document ID index 917 is decompressed to yield a collection of document ID 904 and a collection of offsets 905. The collection of document ID 904 comprises concept identifiers 919, 920, 921, and 922. The collection of offsets comprises offsets 923, 924, 925, and 926. The nth document ID of the collection of concept identifiers 904 corresponds to the nth offset of the collection of offsets 905. For example, document ID. 922 corresponds to offset 926. Offset 914 provides a pointer 927 to a microindex 928 in positions file 906.

Thus, this relationship provides indexing between a concept identifier, such as concept identifier 910, and a microindex, such as microindex 928. Because of this indexing, concept identifier 910 can be used to uniquely identify microindex 928, while, in reverse, microindex 928 can be used to uniquely identify concept identifier 910.

Children File

A children file is a collection of lists of identifiers, where each list contains identifiers of more specific concepts for a given concept. For example, "song" is a more specific concept of "music".

Figure 10:
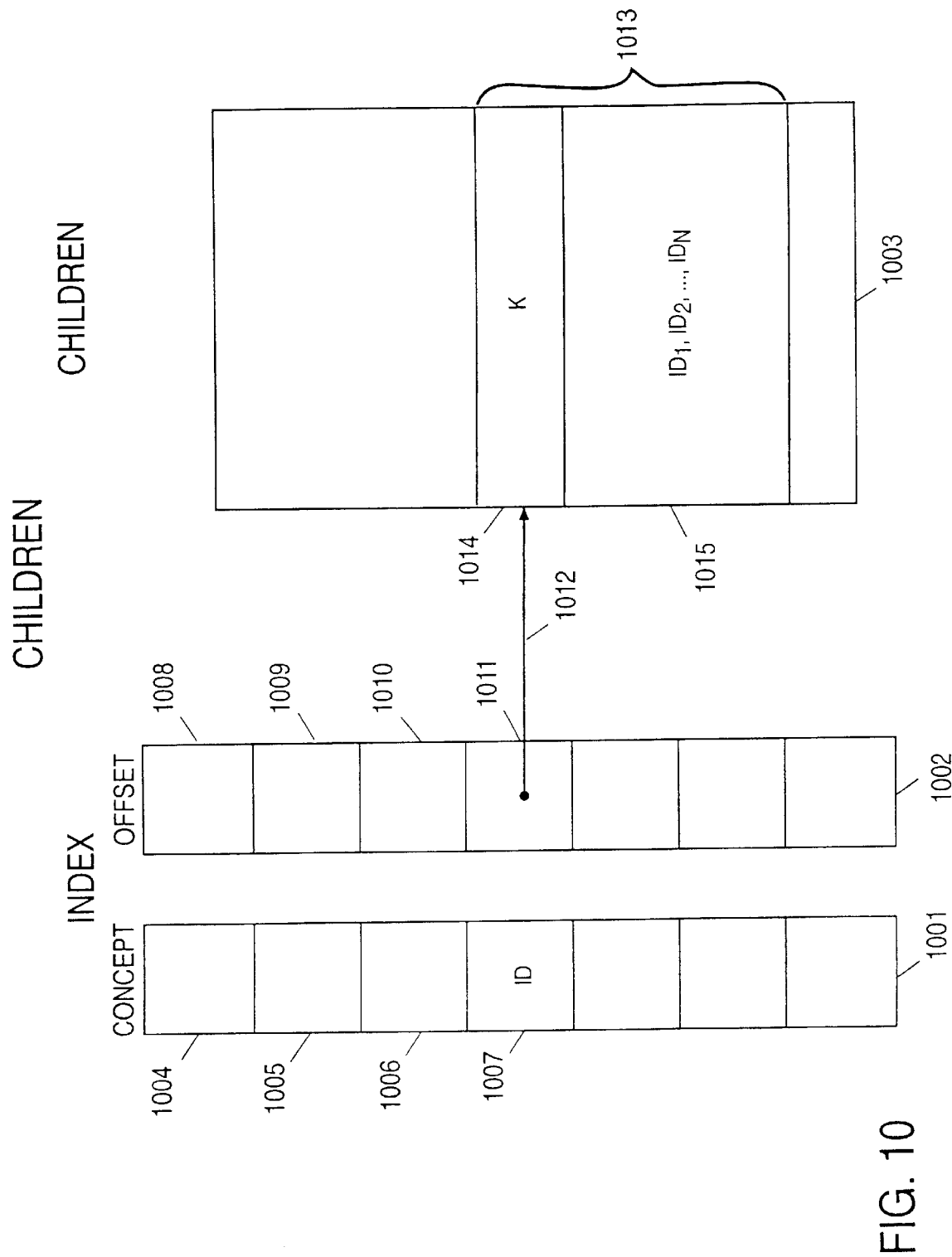
FIG. 10 is a drawing illustrating the relationship between a children index file and a children file according to one embodiment of the invention.

FIG. 10 is a drawing illustrating the relationship between a children index file and a children file according to one embodiment of the invention. The children index file comprises a collection of concept identifiers 1001 and a combination of offsets 1002. The collection of concept identifiers 1001 comprises concept identifiers 1004, 1005, 1006, and 1007. The collection of offsets comprises offsets 1008, 1009, 1010, and 1011. The nth concept identifier corresponds to the nth offset. For example, concept identifier 1007 corresponds to offset 1011. Offset 1011 provides a pointer 1012 to a compressed list of children 1013 among a plurality of compressed lists of children in children file 1003. The compressed lists of children 1013 comprises a compression factor, or key, 1014 and compressed concept identifiers 1015 for the children. Key 1014 is used to decompress the compressed concept identifiers 1015 to yield the concept identifiers of the children.

The format of a children file data structure according to one embodiment of the invention is that the data structure begins with one byte of information used to store a compression factor, or key, used for decompression. This one byte of information is followed by a plurality of bytes (n bytes) of information used to store compressed concept identifiers. The number of bytes of information (n bytes) used to store the compressed concept identifiers may vary and depends on the compression factors, or keys, used.

Children Index

A children index is an association index of concept identifiers and corresponding offsets of compressed lists of children in the children file.

Because each microindex contains all of the indexing information relating to a particular document, each microindex contains all of the information needed to find hits for queries within a particular document. Thus, for indexing purposes, a microindex essentially provides a self-contained image of a document. Because of the compression technique used, the microindex is much smaller than an uncompressed index for the document or the compressed document itself.

Because of the one-to-one correspondence between documents and microindexes, the microindexes may be used to provide incremental indexing. In incremental indexing, indexing information can be easily updated by removing old microindexes and replacing them with new microindexes. This feature is especially useful when a change has been made to the document being indexed, and the indexing information needs to be updated. Such updating can be performed without affecting the indexing information for any other documents.

Since microindexes are small and specific to particular documents, the microindexes of relevant documents may be broadcast or transmitted to search engines, such as distributed search engines. Thus, the data processing operations required for searching for information can be distributed. The search engines performing the searching can be located separately from the database containing the information being searched since microindexes of the information being searched can easily be transmitted from the database to the search engine.

One embodiment of the invention provides an association of and storage format of concept names and concept identifiers. These identifiers are small integers. The concept names are mapped to the concept identifiers. For example, a concept name for the word "computer" is mapped to a unique identifier, for example, 101. Information concerning occurrences of the word "computer" is then stored using its concept identifier of 101. The concept identifiers and the information corresponding to the positions of the concept names represented by the concept identifiers within documents are combined to form C/P groups. Sorting is performed on the C/P groups to arrange the concepts in the order of their concept identifiers. This information is then divided into groups of, in one embodiment, 16, but other group sizes may be used, for example, other powers of 2.

Thus, for a collection of documents, a sequence of concept identifiers is produced for all of the concepts that occurred in some document. There may be many concepts that occurred in a document. Also, a particular concept may have occurred many times in one or more documents. Each concept will have some number of associated positions where this concept occurred.

Thus, for example, the word "computer" may occur in several places in a document about computers, such as some piece of news. Thus, the identifier 101, which is the identifier for the concept "computer," occurred in a number of positions. This information is indexed by first sorting the concept identifiers, then dividing them into groups of 16, resulting in an individual C/P group. The C/P group contains a list of the concept identifiers of the concepts. This list is compressed to reduce the amount of memory needed for storing the list and the amount of time needed for transmitting the list.

The position information of a C/P group is in the form of a compressed list of all of the positions of all of the concepts from a particular concept identifier set within the range of that C/P group. The positions are organized as an ordered sequence. Within each C/P group the concept identifiers are listed and assigned labels from 0 through 14 according to the order of their listing. Each position is followed by a 4-bit quantity which specifies one of the identifiers for that C/P group. For example, a position P2 may be followed by four bits, such as 0 0 1 0. These four bits mean that the position P2 relates to the second concept, because 0 0 1 0 is the binary representation of the number two.

The full concept identifier for the second concept is obtained from the listing of complete concept identifiers at the beginning of the C/P group. Thus, it is unnecessary to repeat the complete concept identifier for every position relating to that concept identifier within a C/P group. It is sufficient to give enough information to select one concept identifier from the concept identifiers for that C/P group.

By sorting the concept identifiers before dividing the information into C/P groups, the C/P groups are grouped in order of concept identifiers. Thus, by storing information about which concept identifiers are present in which C/P groups as entries in MaxTable, the concept identifiers within the C/P groups can be identified without decompressing the C/P groups. Thus, to search for a particular concept, the C/P group relating to that particular concept can be readily identified and decompressed without the need to decompress other C/P groups. Thus, only those C/P groups which are pertinent to the query need be decompressed.

KTable, LenTable, and MaxTable are used together to determine which C/P groups are to be decompressed. MaxTable is a compressed list of ordered concept identifiers which are maximal concept identifiers for each C/P group. The relevant concept identifiers of the query are compared against this table to determine which C/P groups are relevant. Once the relevant C/P groups are determined, their entries in LenTable are used to determine the locations of the relevant C/P groups based on the information in LenTable describing the length of each C/P group.

Only 15 labels (0–14) of the 16 possible labels are used as concept identifier labels within each C/P group. The 16th label (15) is used to store the MaxValue from MaxTable.

Therefore, to determine if there may be occurrences of a concept within a document, the microindex for that document is obtained and its header is examined. If it is a single group index, that single group index is decompressed. Otherwise, if the document was long enough to contain more than 16 concepts, it will be a multiple group index. For a multiple group index, first the three tables KTable, LenTable, and MaxTable are decompressed. The concept identifiers for the relevant concepts of the query are compared to the MaxTable entries. If relevant C/P groups are found, LenTable is used to provide information on the location of the relevant C/P groups, since the C/P groups can be of variable length, depending on how many positions there are in the group. KTable is then used to decompress the relevant C/P groups.

The children file and children index file maintain relationships between concepts stored in an index. Thus, related concepts are considered during a searching process. Thus, for example, a query for the concept "music" can also return results in which the concepts of "songs" or "piano" occur.

A documents index provides an association from concepts to documents in which these concepts occur. As an example, for a query for the word "computer," the concept identifier for the word "computer," for example, 101, is located in the left column of the documents index. The corresponding pointer in the offset column is then identified. This pointer points to a list in the documents file. The documents file contains a compressed list of document identifies in which the concept corresponding to the specified concept identifier occurred. The compressed list begins with a key, K, for decompression, followed by the actual bytes containing the compressed sequence. This structure is referred to as an inverted file.

The documents file is also useful for raising the standards for documents identified during a search. For example, as a search progresses, if many documents are found to contain the desired concepts, the search engine can use the documents file to identify those documents in which more of the desired concepts occurred. Thus, the search criteria can be made more restrictive during the course of the search to eliminate documents that have only few or scattered occurrences of the desired concepts.

Reconstruction of Files Based on the Positions File

This invention also provides an additional compressive effect on the indexing information by allowing the reconstruction of certain files from a single file. Thus, only the single file that provides the basis for such reconstruction needs to be transmitted and stored. Thus, transmission of the indexing information can be accomplished in much less time, and storage of the indexing information can be achieved with much less memory.

An additional benefit of the reconstruction feature is that it greatly increases the efficiency of incremental indexing. If changes occur in documents, only an updated version of the single file that provides the basis for the reconstruction needs to be transmitted. Upon receipt, that file can be used to reconstruct the other files, and all of the files will have fully updated information.

An interesting feature of this file structure is that this documents file, the document index file, and the position index file can be completely reconstructed from the positions file. With just the positions, the inverted file can be efficiently reconstructed. This feature simplifies the indexing process tremendously and makes it faster and also makes index sizes even smaller because only the positions file in the index is needed to recreate the inverted file.

The C/P groups contain concepts which are already ordered. Thus, the positions file represents a whole matrix of C/P groups. There is sequence of C/P groups within each microindex and then many microindexes stacked upon one another. Thus, the modularity of the microindexes is useful for sending individual microindexes somewhere or for incremental indexing which involves deleting some microindexing and replacing them with others for updated files. This structure is also advantageous for producing the inverted file, for producing the left hand side information which is going from concept identifiers to the document numbers in which these concepts were spotted.

The positions index file provides identifiers for documents and the corresponding offset pointers to the microindexes for this index. Thus, using the same concept identifier structure for documents, the documents are also represented as concepts. For example, a document can be stored in a tree structure together with a concept identifier for that document. The microindex corresponding to that concept identifier would be the microindex for that particular document.

The process makes use of the fact that concepts are already ordered within microindexes. That is, it is able to jump from one C/P group to another and process them in appropriate order. To determine which microindex to process next, a priority queue is used. The priority queue provides a certain ordering criterion that organizes or orders all the microindexes that you are working on by the range of concepts that you are working on right now. The microindexes are organized by range and then secondarily under document number so that all the concepts are covered range by range, and within each range, by document identifiers in order. The priority queue is processed until nothing remains on it, which corresponds to reaching the end of all the microindexes. The priority queue effectively provides a shifting window covering a range of concepts at a given time. The priority queue determines which range of concepts to process and when and where to move the shifting window.

Figure 11:
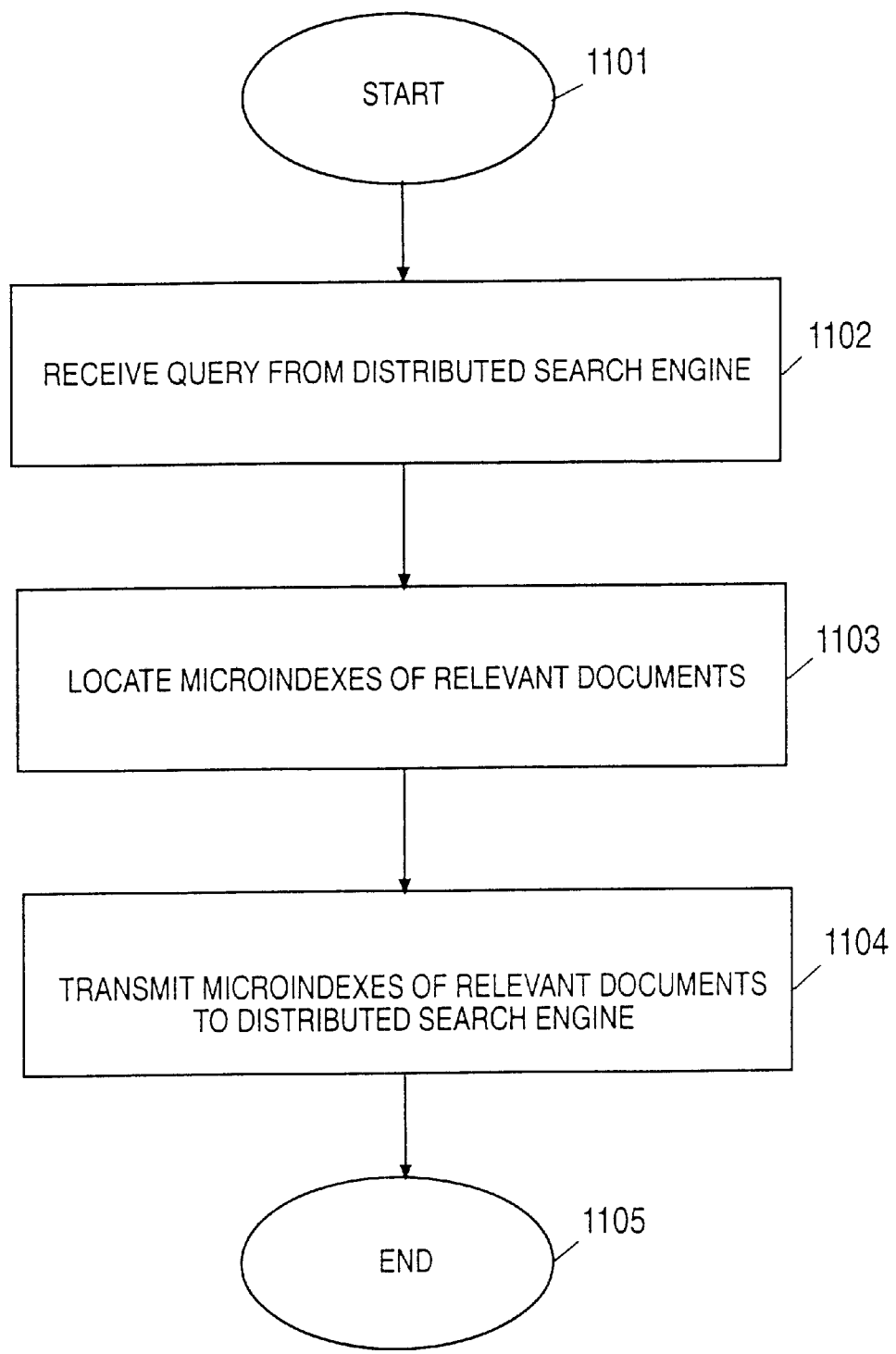
FIG. 11 is a flow diagram illustrating a process according to the invention by which documents are provided to distributed search engines.

FIG. 11 is a flow diagram illustrating a process according to the invention by which documents are provided to distributed search engines. The process begins in step 1101. In step 1102, a query is received from a distributed search engine. In step 1103, the microindexes of relevant documents are located. In step 1104, the microindexes of the relevant documents are transmitted to the distributed search engine. In step 1105, the process ends.

Figure 12:
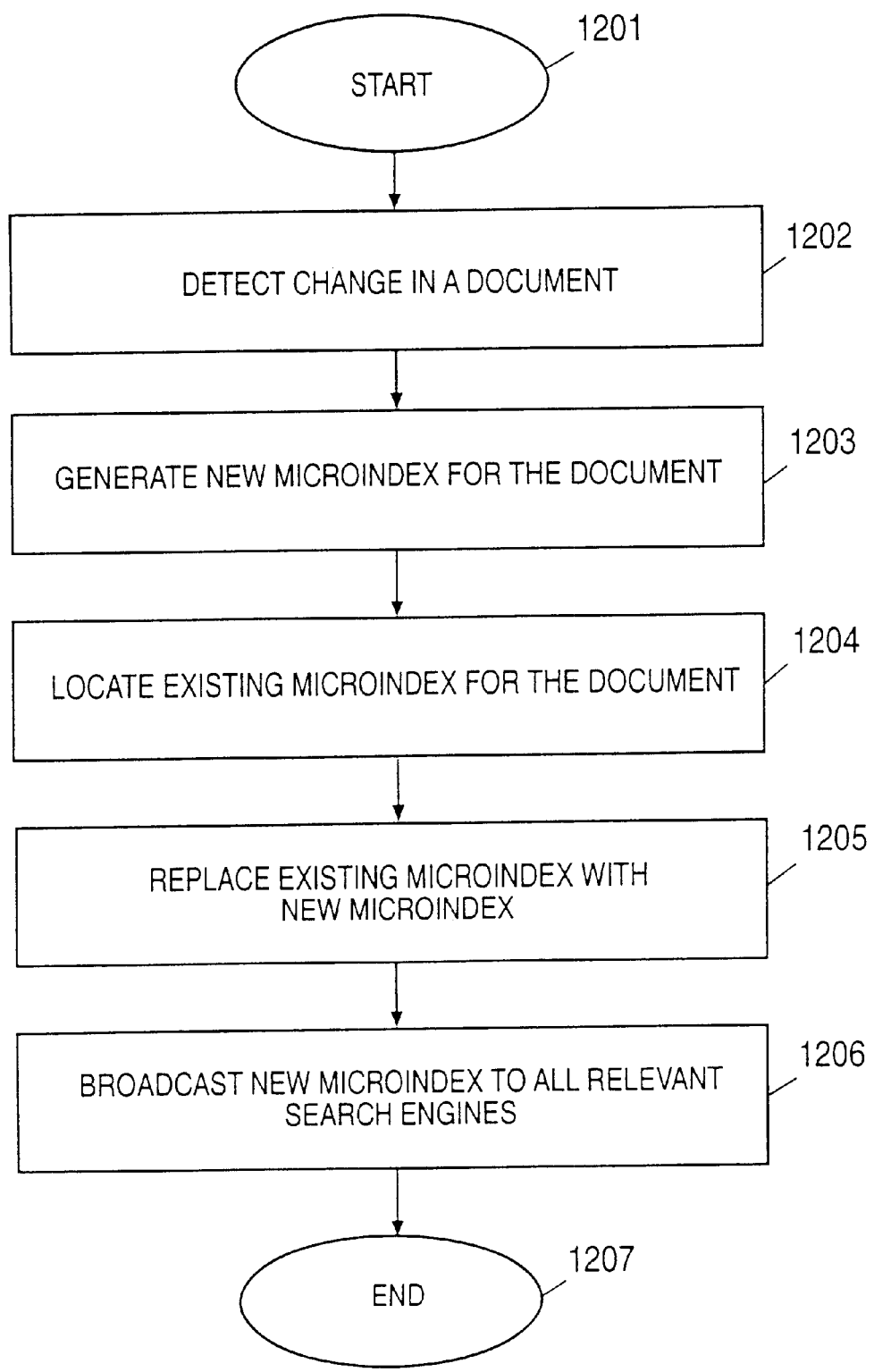
FIG. 12 is a flow diagram illustrating a process according to the invention by which incremental indexing is provided.

FIG. 12 is a flow diagram illustrating a process according to the invention by which incremental indexing is provided. The process begins in step 1201. In step 1202, a change is detected in a document. In step 1203, a new microindex that accurately reflects the change is generated for the document. In step 1204, the existing microindex for the document is located. In step 1205, the existing microindex for the document is replaced with the new microindex. In step 1206, the new microindex is broadcast to all relevant search engines. In step 1207, the process ends.

Figure 13A:
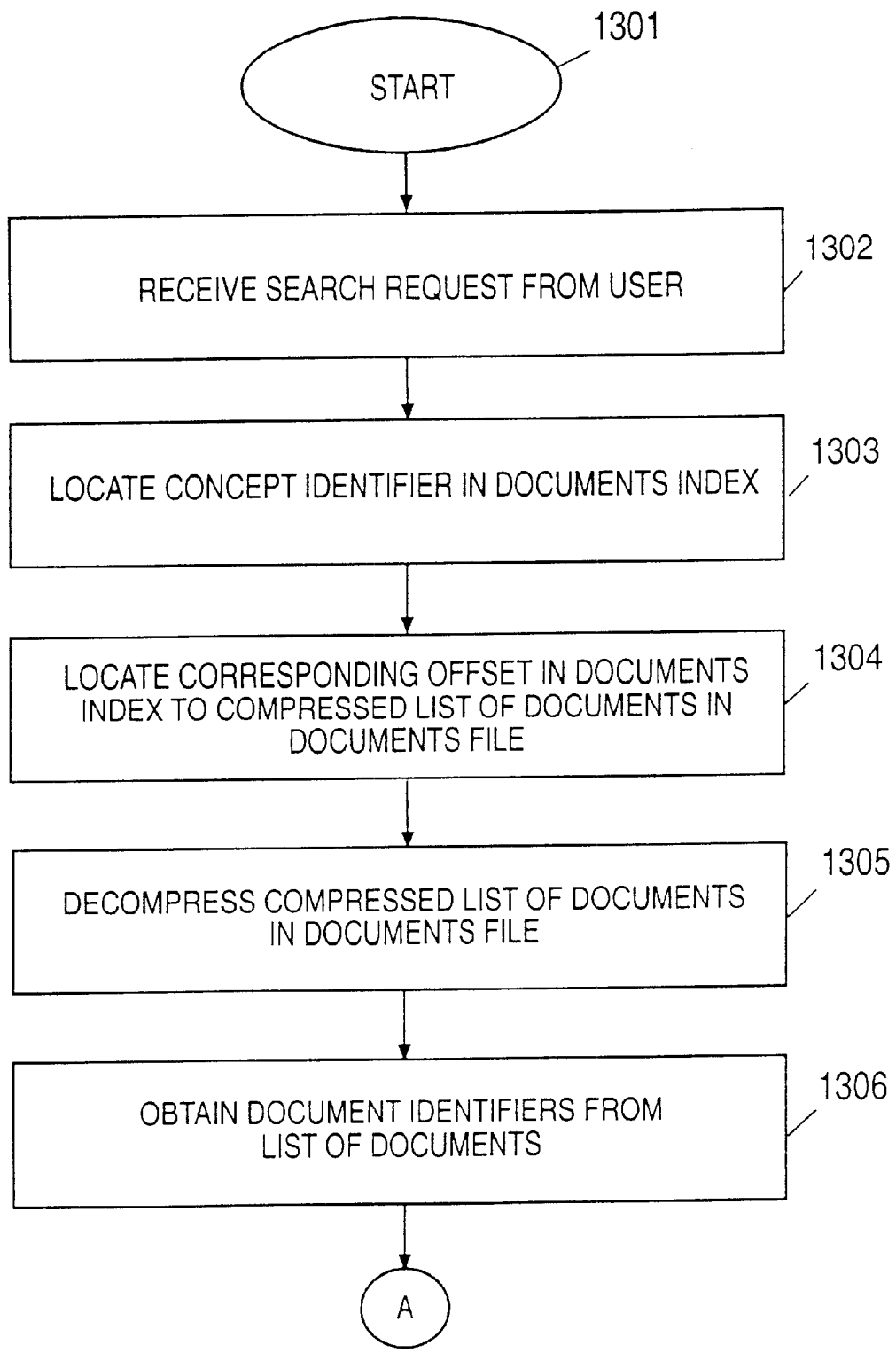
FIGS. 13A and 13B are sheets of a flow diagram illustrating a process according to the invention by which incremental indexing is provided.
Figure 13B:
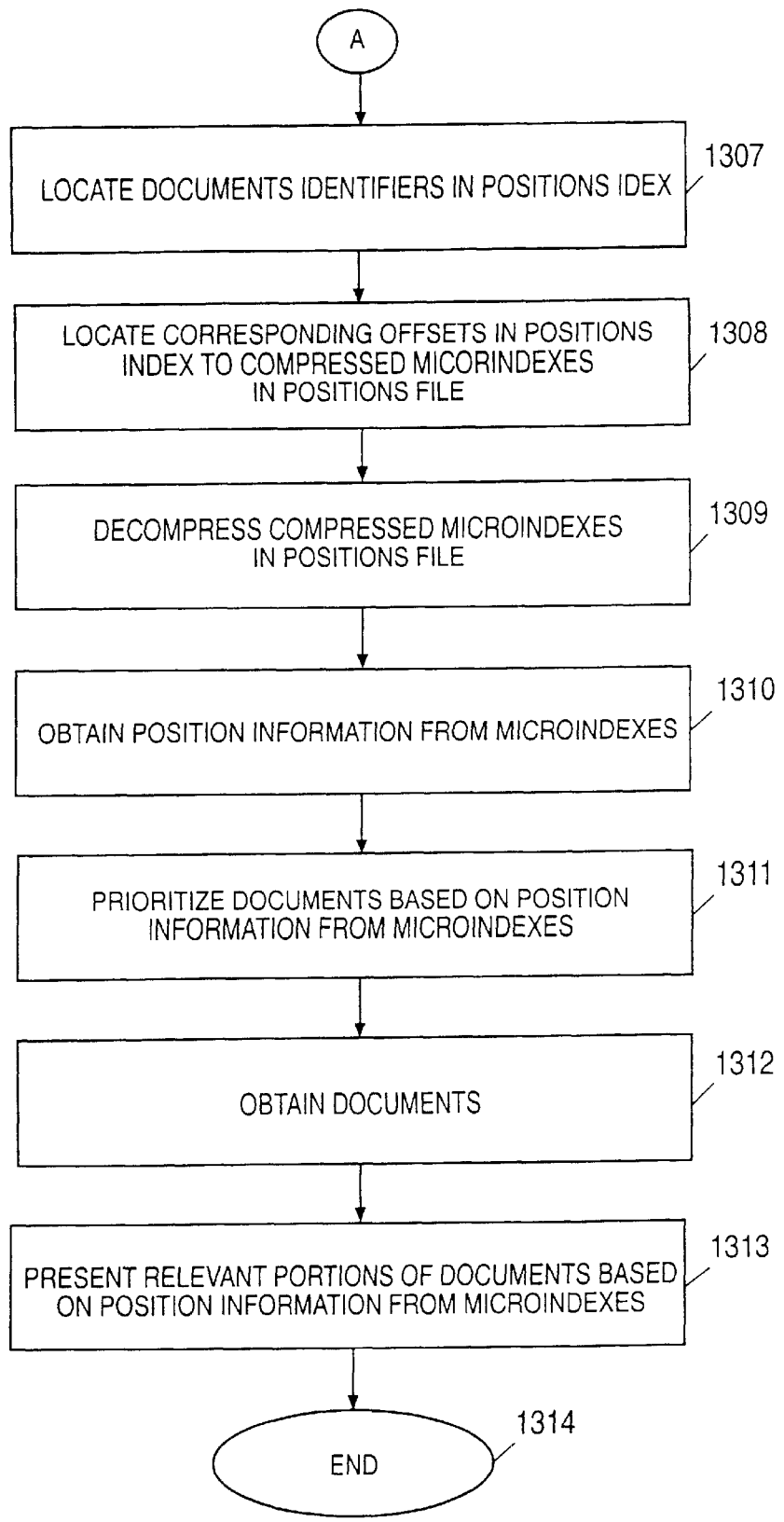

FIGS. 13A and 13B are sheets of a flow diagram illustrating a process according to the invention by which incremental indexing is provided. The process begins in step 1301. In step 1302, a search request is received from a user. In step 1303, a concept identifier is located in a documents index. In step 1304, an offset in the documents index corresponding to the concept identifier and pointing to a compressed list of documents in a documents file is located. In step 1305, the compressed list of documents in the documents file is decompressed.

In step 1306, document identifiers are obtained from the list of documents. In step 1307, the document identifiers are located in the positions index. In step 1308, offsets in a positions index corresponding to the document identifiers and pointing to compressed microindexes in a positions file are located. In step 1309, the compressed microindexes in the positions file are decompressed. In step 1310, position information is obtained from the microindexes. In step 1311, documents are prioritized based on position information from the microindexes. In step 1312, the documents themselves are obtained. In step 1313, relevant portions of the documents are presented based on the position information from the microindexes. In step 1314, the process ends.

Figure 14A:
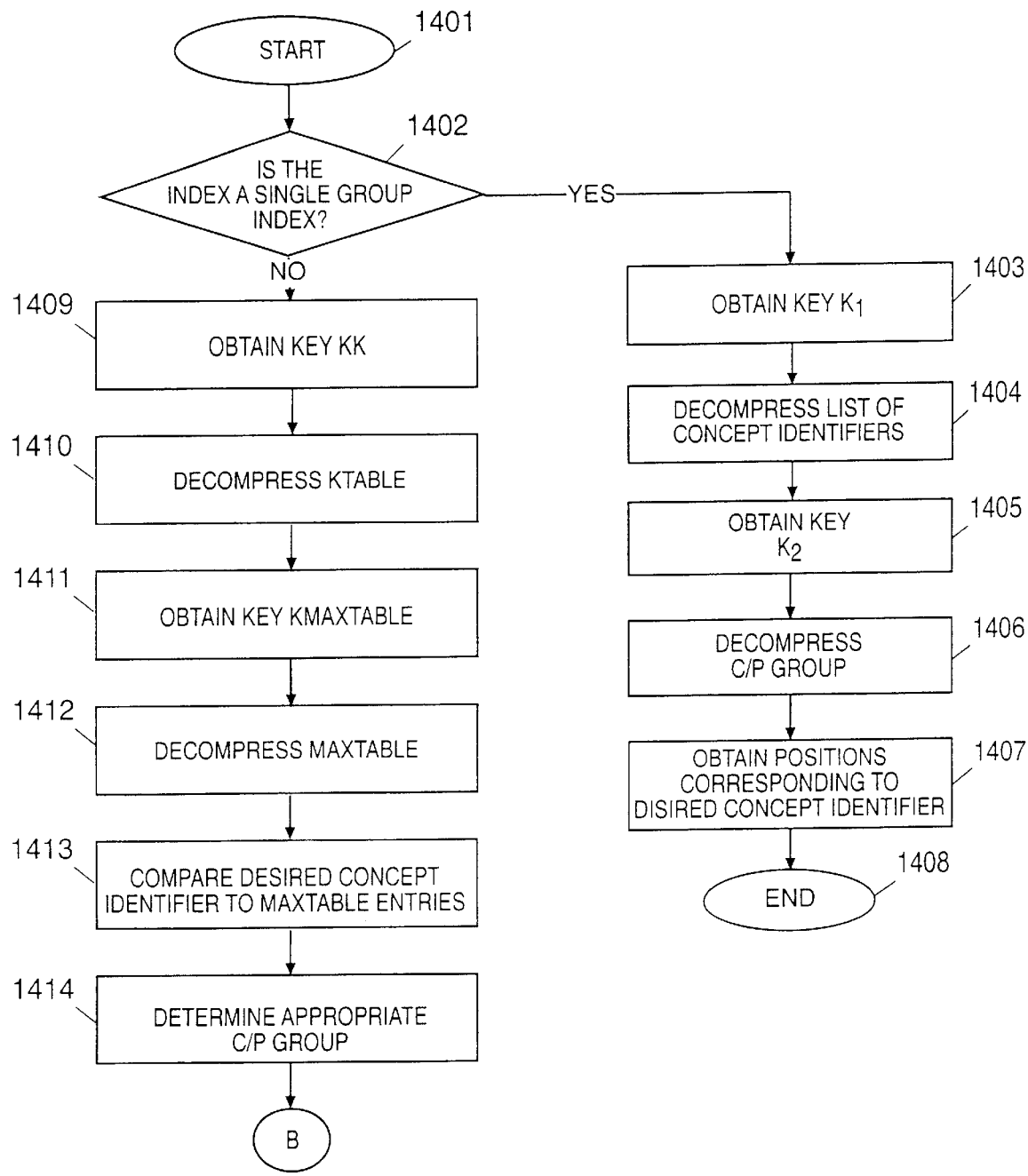
FIGS. 14A and 14B are sheets of a flow diagram illustrating a process according to the invention by which position information is obtained from compressed indexes.
Figure 14B:
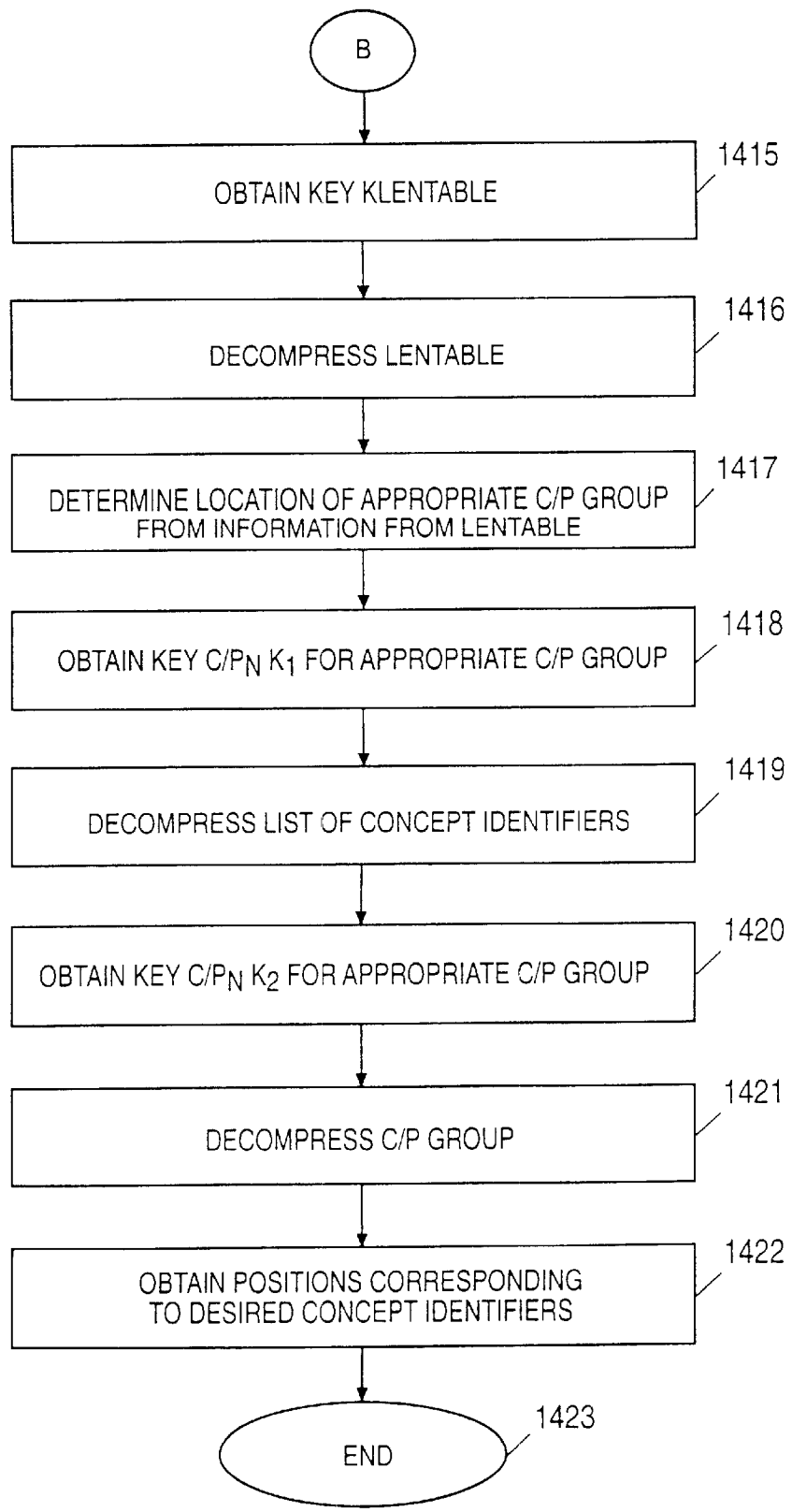

FIGS. 14A and 14B are sheets of a flow diagram illustrating a process according to the invention by which position information is obtained from compressed indexes. The process begins in step 1401. In step 1402, a decision is made as to whether or not the index is a single group index. If the index is a single group index, the process continues in step 1403. In step 1403, key $K_1$ is obtained. In step 1404, a list of concept identifiers is decompressed using key $K_1$. In step 1405, key $K_2$ is obtained. In step 1406, a C/P group is decompressed using key $K_2$. In step 1407, positions corresponding to desired concept identifiers are obtained. In step 1408, the process ends.

If, in step 1402, the index is determined not to be a single group index, the process continues in step 1409. In step 1409, key KK is obtained. In step 1410, a KTable is decompressed using key KK. In step 1411, key $K_{maxtable}$ is obtained. In step 1412, a MaxTable is decompressed using key $K_{maxtable}$. In step 1413, the desired concept identifier is compared to the MaxTable entries. In step 1414, the appropriate C/P group is determined on the basis of the comparison between the desired concept identifier and the MaxTable entries.

In step 1415, the key $K_{lentable}$ is obtained. In step 1416, LenTable is decompressed using key $K_{lentable}$. In step 1417, the location of an appropriate C/P group is determined using the length information from LenTable. In step 1418, key $C/P_n$ $K_1$ for the appropriate C/P group is obtained from KTable. In step 1419, a list of concept identifiers is decompressed. In step 1420, key $C/P_n$ $K_2$ for the appropriate C/P group is obtained from KTable. In step 1421, the C/P group is decompressed. In step 1422, positions corresponding to the desired concept identifier are obtained from the C/P group. In step 1423, the process ends.

Figure 15:
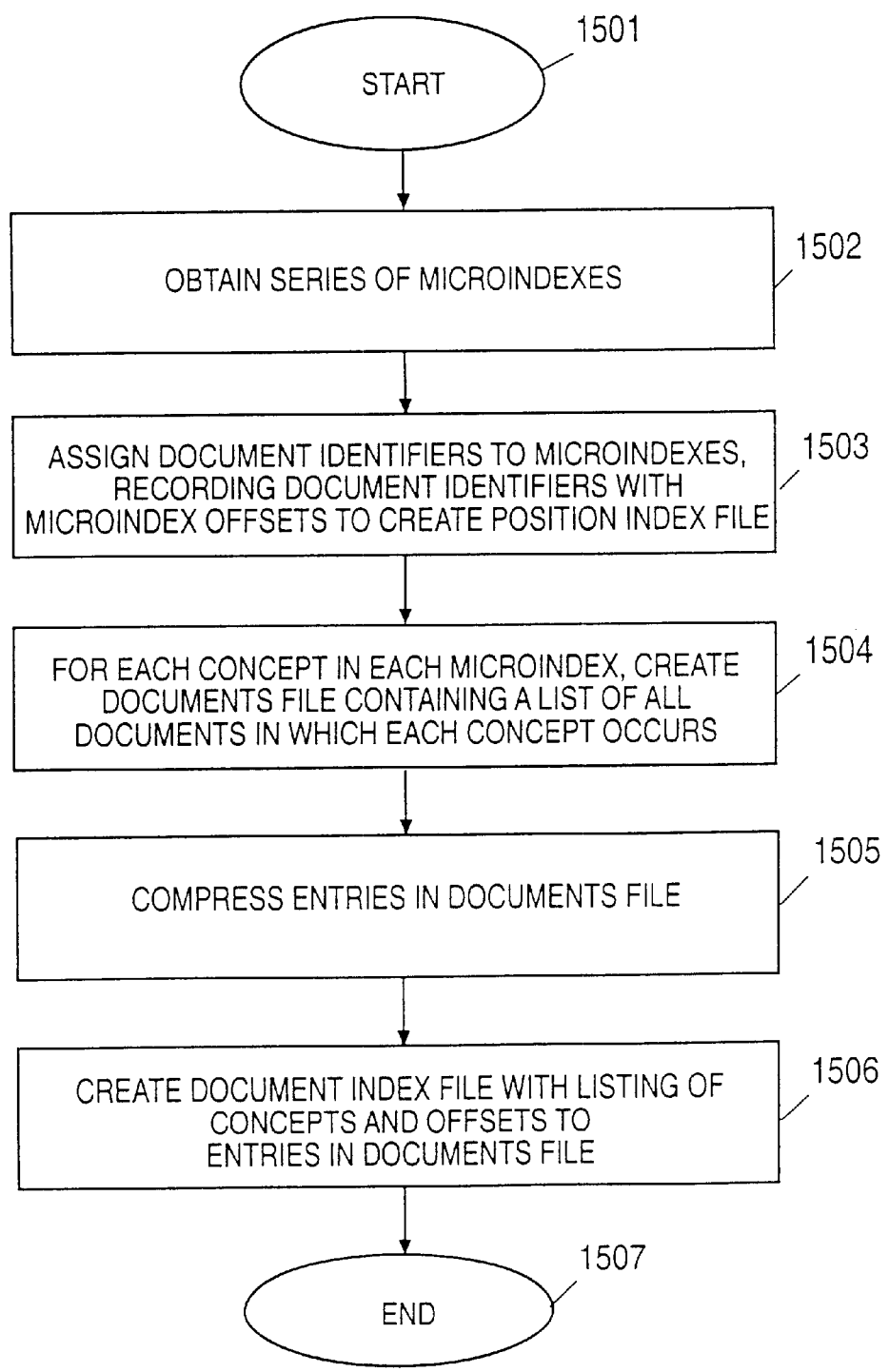
FIG. 15 is a flow diagram illustrating a process according to the invention by which a positions index file, a documents file, and a documents index file are created from a positions file.

FIG. 15 is a flow diagram illustrating a process according to the invention by which a positions index file, a documents file, and a documents index file are created from a positions file. The process begins in step 1501. In step 1502, a series of microindexes is obtained. In step 1503, document identifiers are assigned to the microindexes. The document identifiers are recorded with the microindex offsets to create a position index file. In step 1504, for each concept in each microindex, a documents file is created containing a list of all documents in which each concept occurs. In step 1505, entries in the documents file are compressed. In step 1506, a documents index file is created with a listing of concepts and offsets to entries in the documents file. The process ends in step 1507.

Figure 16A:
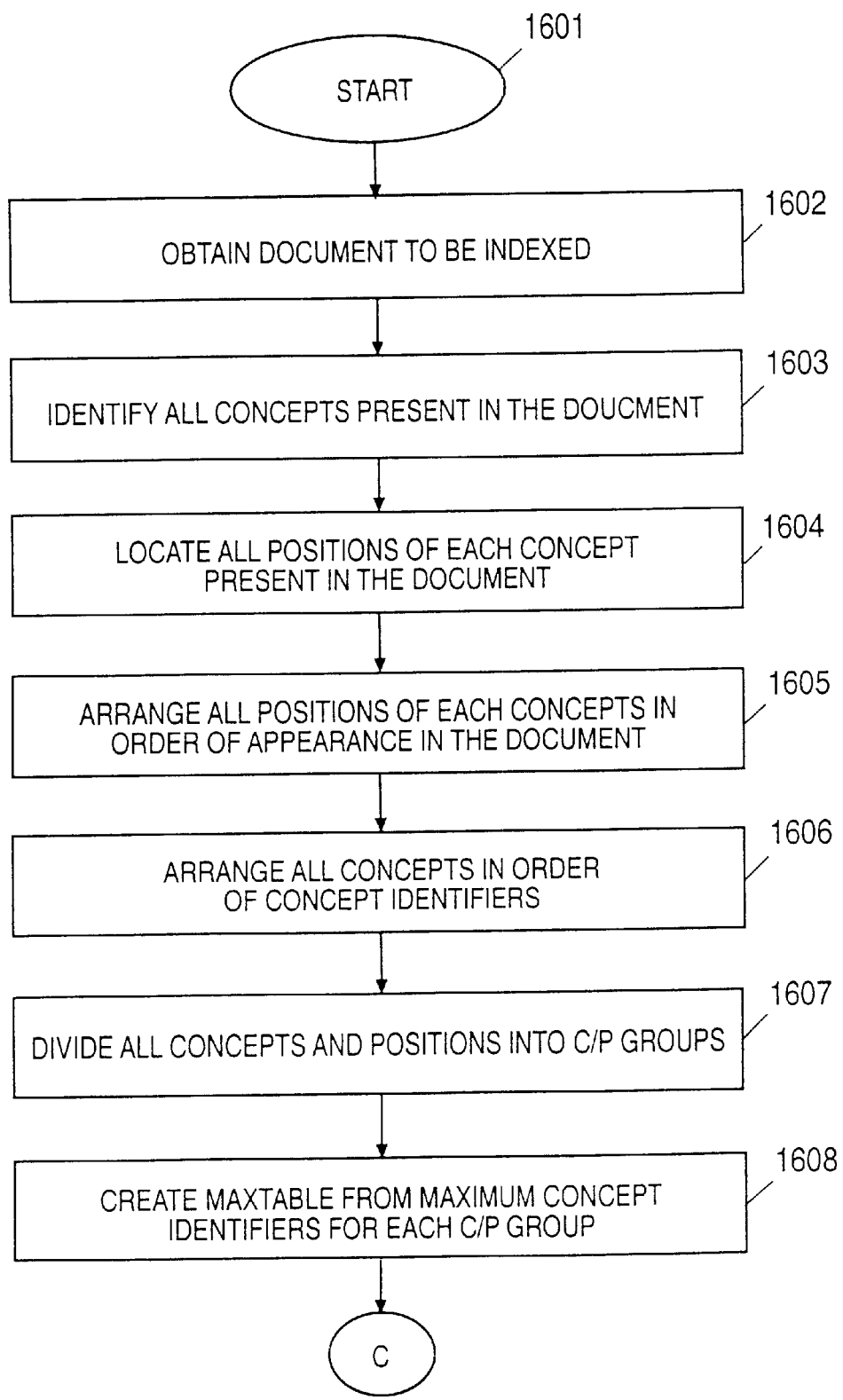
FIGS. 16A and 16B are sheets of a flow diagram illustrating a process according to one embodiment of the invention in which a microindex is created.
Figure 16B:
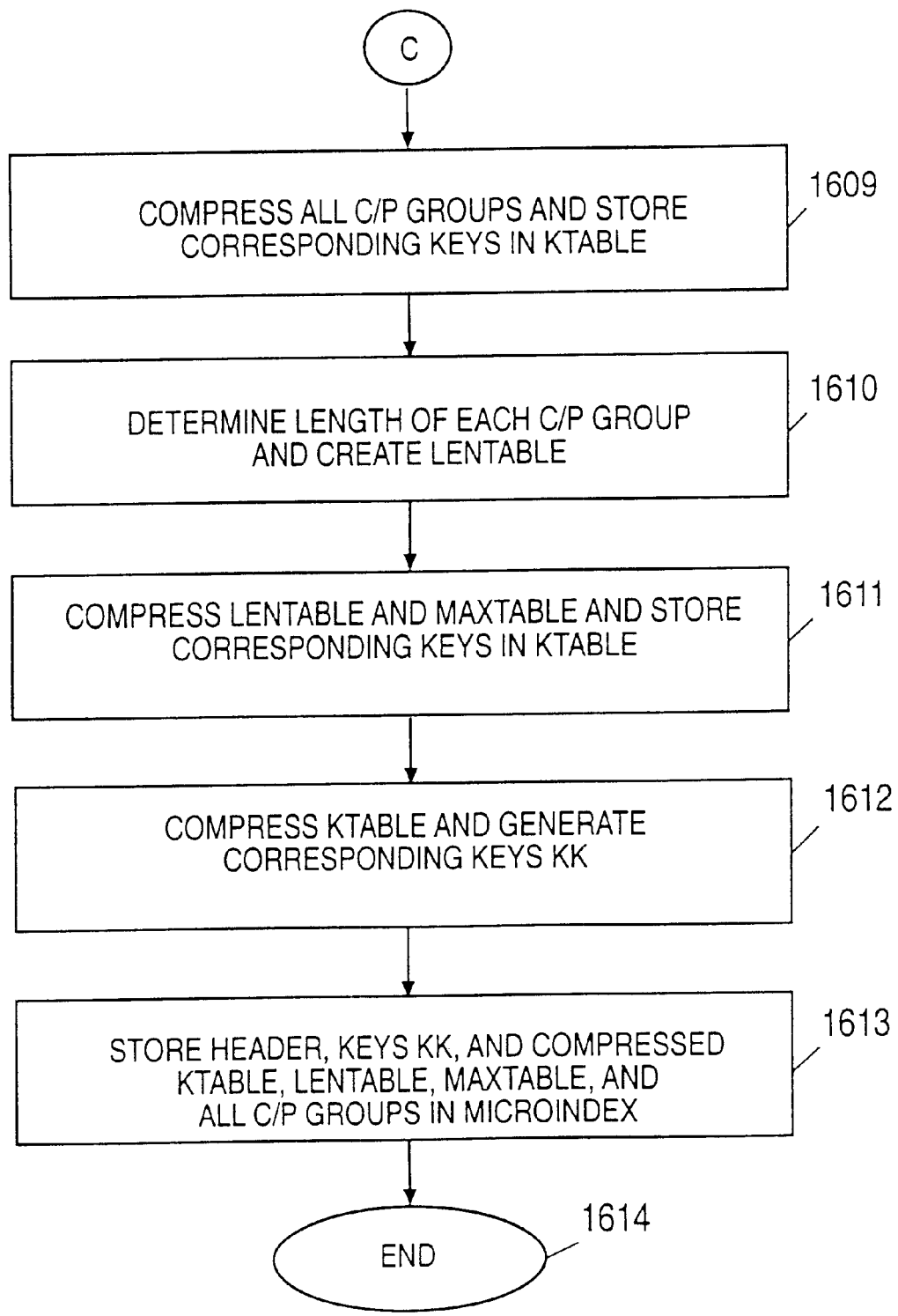

FIGS. 16A and 16B are sheets of a flow diagram illustrating a process according to one embodiment of the invention in which a microindex is created. The process begins in step 1601. In step 1602, a document to be indexed is obtained. In step 1603, all concepts present in the document are identified. In step 1604, for each concept in the document, all positions at which each of the concepts is present in the document are located. In step 1605, for each concept, all positions of each concept are arranged in order of appearance in the document. In step 1606, all concepts in the document are arranged in order of their respective concept identifiers.

In step 1607, all concepts and positions are divided into C/P groups. For example, one embodiment of the invention has C/P groups of 15 concepts each. Thus, if 15 or fewer concepts are present in the document, a single group index is generated. However, if more than 15 concepts are present in the document, a multiple group index is generated. Each C/P group within such a multiple group index contains 15 concept identifiers along with their corresponding positions.

In step 1608, a MaxTable is created from the maximum concept identifiers for each C/P group. In step 1609, all C/P groups are compressed and their corresponding keys are stored in KTable. In step 1610, the length of each C/P group is determined and a LenTable is created. In step 1611, the LenTable and MaxTable are compressed and their corresponding keys are stored in KTable. In step 1612, the KTable is compressed and the corresponding keys KK are generated. In step 1613, a header, keys KK, and the compressed KTable, LenTable, MaxTable, and all C/P groups are stored in a microindex. The process ends in step 1614.

Thus, a technique for indexing data has been described in conjunction with one or more specific embodiments. The invention is defined by the claims and their full scope of equivalents.

What is claimed is:

1. A method of generating a documents index file useable by distributed search engines comprising:

obtaining one or more documents to be indexed;

generating a microindex of concepts for each of said one or more documents, said microindex having a document identification;

creating a positions file having an entry of said microindex, said positions file comprising entries of one or more microindexes;

creating a positions index file for said positions file, said positions index file having an entry for each of said one or more microindexes in said positions file, said entry in said positions index file comprising said document identification and an offset of said microindex's entry in said positions file;

creating a documents file having an entry for each of said concept in said microindex, said entry in said documents file comprising one or more document identifications of microindexes in which each of said concept occurs;

creating a documents index file for said documents file, said documents index file having an entry for each of said concept, said entry in said documents index file comprising an identification for said concept and an offset of said concept's entry in said documents file.

2. The method of claim 1 wherein said creating a positions index file comprises:

assigning document identifiers to each of said microindexes;

determining offset for each of said microindexes in said positions file;

recording said document identifiers and said offsets in said positions index file.

3. The method of claim 1 wherein said entries in said documents file are compressed.

4. The method of claim 1 wherein said generating one or more microindexes comprises:

identifying all concepts in a document to be indexed;

assigning a unique concept identifier to each of said concepts;

generating concept-position groups for said document;

creating a max-table comprising entries of the maximum concept identifiers for each of said concept-position groups;

creating a length-table comprising entries of the length of each of said concept-position groups;

generating a keys-table for said document;

generating a microindex for said document comprising compressed form of said concept-position groups, said keys-table, said length-table, and said max-table.

5. The method of claim 4 wherein said generating concept-position groups comprises:

locating positions of each concept present in said document;

arranging said positions in order of appearance in said document;

arranging all concepts in order of said concept identifiers; and dividing said concepts and said positions into concept-position groups.

6. The method of claim 4 wherein said generating a keys-table comprises:

creating a data structure for a keys-table;

compressing said concept-position groups and storing the compression factors in said data structure;

compressing said max-table and storing the compression factor in said data structure;

compressing said length-table and storing the compression factor in said data structure; and compressing said data structure.

7. The method of claim 6 wherein said microindex further comprises the compression factor of said keys-table and a header.

8. The method of claim 1 wherein the microindex for a particular document, stored in said positions file, is replaceable without affecting microindexes of other documents in said positions file when said particular document changes.

9. A method for satisfying a users search request comprising:

receiving search request from a user;

parsing said search request into concepts;

searching a documents index file for relevant documents based on said concepts, wherein said searching a documents index file for relevant documents comprises:

locating concept identifiers in said documents index file;

locating the offsets in said documents index file corresponding to the compressed list of documents in a documents file;

decompressing said compressed list of documents;

obtaining document identifiers from said list of documents;

locating said document identifiers in a positions index file;

locating offsets in said positions index file corresponding to the compressed microindexes in a positions file;

decompressing said compressed microindexes;

obtaining position information from said decompressed microindexes;

prioritizing documents based on said position information;

said method for satisfying a users search request further comprising:

obtaining said relevant documents; and presenting relevant portions of said relevant documents to said user.

10. The method of claim 9 wherein said relevant portions of said documents is determined based on said position information.

11. The method of claim 9 wherein said documents file, said documents index file, and said positions index file are reconstructable from said positions file.

12. A computer program product comprising:

a computer usable medium having computer readable program code embodied therein configured to generate a documents index file useable by distributed search engines, said computer program product comprising computer readable program code configured to cause a computer to:

obtain one or more documents to be indexed;

generate a microindex of concepts for each of said one or more documents, said microindex having a document identification;

create a positions file having an entry of said microindex, said positions file comprising entries of one or more microindexes;

create a positions index file for said positions file, said positions index file having an entry for each of said one or more microindexes in said positions file, said entry in said positions index file comprising said document identification and an offset of said microindex's entry in said positions file;

create a documents file having an entry for each of said concept in said microindex, said entry in said documents file comprising one or more document identifications of microindexes in which each of said concept occurs;

create a documents index file for said documents file, said documents index file having an entry for each of said concept, said entry in said documents index file comprising an identification for said concept and an offset of said concept's entry in said documents file.

13. The computer program product of claim 12 wherein said create a positions index file comprises computer readable program code configured to:

assign document identifiers to each of said microindexes;

determine offset for each of said microindexes in said positions file;

record said document identifiers and said offsets in said positions index file.

14. The computer program product of claim 12 wherein said entries in said documents file are compressed.

15. The computer program product of claim 14 wherein said generate one or more microindexes comprises computer readable program code configured to:

identify all concepts in a document to be indexed;

assign a unique concept identifier to each of said concepts;

generate concept-position groups for said document;

create a max-table comprising entries of the maximum concept identifiers for each of said concept-position groups;

create a length-table comprising entries of the length of each of said concept-position groups;

generate a keys-table for said document;

generate a microindex for said document comprising compressed form of said concept-position groups, said keys-table, said length-table, and said max-table.

16. The computer program product of claim 15 wherein said generate concept-position groups comprises computer readable program code configured to:

locate positions of each concept present in said document;

arrange said positions in order of appearance in said document;

arrange all concepts in order of said concept identifiers; and divide said concepts and said positions into concept-position groups.

17. The computer program product of claim 15 wherein said generate a keys-table comprises computer readable program code configured to:

create a data structure for a keys-table;

compress said concept-position groups and storing the compression factors in said data structure;

compress said max-table and storing the compression factor in said data structure;

compress said length-table and storing the compression factor in said data structure; and compress said data structure.

18. The computer program product of claim 17 wherein said microindex further comprises the compression factor of said keys-table and a header.

19. The computer program product of claim 12 wherein a microindex for a document, stored in said positions file, is replaceable without affecting microindexes of other documents in said positions file when said document changes.

20. A computer program product comprising:

a computer usable medium having computer readable program code embodied therein configured to satisfy a users search request, said computer program product comprising computer readable program code configured to cause a computer to:

receive search request from a user;

parse said search request into concepts;

search a documents index file for relevant documents based on said concepts, wherein said search a documents index file for relevant documents comprises:

locate concept identifiers in said documents index file;

locate the offsets in said documents index file corresponding to the compressed list of documents in a documents file;

decompress said compressed list of documents;

obtain document identifiers from said list of documents;

locate said document identifiers in a positions index file;

locate offsets in said positions index file corresponding to the compressed microindexes in a positions file;

decompress said compressed microindexes;

obtain position information from said decompressed microindexes;

prioritize documents based on said position information;

said computer program product further comprising computer readable program code configured to cause a computer to:

obtain said relevant documents; and present relevant portions of said relevant documents to said user.

21. The computer program product of claim 20 wherein said relevant portions of said documents is determined based on said position information.

22. The computer program product of claim 20 wherein said documents file, said documents index file, and said positions index file are reconstructable from said positions file.

23. An apparatus for generating a documents index file useable by distributed search engines comprising:

a positions file comprising one or more microindexes, wherein there is a microindex for each indexed document;

a positions index file for said positions file, said positions index file having an entry for each of said one or more microindexes in said positions file, said entry in said positions index file comprising a document identification and an offset of said microindex's entry in said positions file;

a documents file comprising an entry for each concept in said microindexes, said entry in said documents file comprising one or more document identifications of microindexes in which each of said concept occurs;

a documents index file, said documents index file having an entry for each of said concept, said entry in said documents index file comprising an identification for said concept and an offset of said concept's entry in said documents file.

24. The apparatus of claim 23 wherein said positions index file comprises:
   document identifiers to each of said microindexes;
   offset for each of said microindexes in said positions file;
   record of said document identifiers and said offsets in said positions index file.

* * * * *